United States Patent
Katz et al.

(10) Patent No.: US 9,583,016 B2
(45) Date of Patent: Feb. 28, 2017

(54) FACILITATING TARGETED INTERACTION IN A NETWORKED LEARNING ENVIRONMENT

(75) Inventors: Nitzan Katz, Santa Clara, CA (US); Satish Menon, Sunnyvale, CA (US)

(73) Assignee: Apollo Education Group, Inc., Phoenix, AZ (US)

( * ) Notice: Subject to any disclaimer, the term of this patent is extended or adjusted under 35 U.S.C. 154(b) by 0 days.

(21) Appl. No.: 13/408,914

(22) Filed: Feb. 29, 2012

(65) Prior Publication Data

US 2012/0164621 A1 Jun. 28, 2012

Related U.S. Application Data

(63) Continuation of application No. 13/007,166, filed on Jan. 14, 2011, now abandoned.

(60) Provisional application No. 61/295,635, filed on Jan. 15, 2010, provisional application No. 61/334,158, filed on May 12, 2010.

(51) Int. Cl.
  *G09B 7/02* (2006.01)
  *G09B 7/00* (2006.01)
  *G09B 5/00* (2006.01)

(52) U.S. Cl.
  CPC ........... *G09B 7/00* (2013.01); *G09B 5/00* (2013.01)

(58) Field of Classification Search
  CPC ............ G06F 19/363; G09B 7/00; G09B 7/02
  USPC .................................... 434/322, 323, 350
  See application file for complete search history.

(56) References Cited

U.S. PATENT DOCUMENTS

| | | | |
|---|---|---|---|
| 5,306,154 A | 4/1994 | Ujita | |
| 5,493,688 A | 2/1996 | Weingard | |
| 5,727,950 A * | 3/1998 | Cook et al. | 434/350 |
| 5,957,699 A | 9/1999 | Peterson et al. | |
| 6,039,575 A | 3/2000 | L'Allier et al. | |
| 6,091,930 A | 7/2000 | Mortimer | |
| 6,118,973 A | 9/2000 | Ho et al. | |
| 6,146,148 A | 11/2000 | Stuppy | |
| 6,149,441 A | 11/2000 | Pellegrino et al. | |
| 6,301,462 B1 | 10/2001 | Freeman et al. | |
| 6,322,366 B1 | 11/2001 | Bergan et al. | |
| 6,353,447 B1 | 3/2002 | Truluck et al. | |
| 6,505,031 B1 | 1/2003 | Slider et al. | |
| 6,626,679 B2 | 9/2003 | Skeans et al. | |
| 6,782,396 B2 | 8/2004 | Greene et al. | |
| 6,996,366 B2 | 2/2006 | L'Allier et al. | |
| 7,165,054 B2 | 1/2007 | Geoghegan | |

(Continued)

FOREIGN PATENT DOCUMENTS

| EP | 2524362 A1 | 11/2012 |
|---|---|---|
| WO | WO 2009/016612 A2 | 2/2009 |
| WO | WO2011/088412 A1 | 7/2011 |

OTHER PUBLICATIONS

U.S. Appl. No. 13/409,006, filed Feb. 29, 2012, Office Action, Jun. 25, 2014.

(Continued)

*Primary Examiner* — Robert J Utama
*Assistant Examiner* — Elroy S Crocker
(74) *Attorney, Agent, or Firm* — Hickman Palermo Becker Bingham LLP

(57) ABSTRACT

A method and apparatus for facilitating interaction in a learning environment is provided. Based on the subject matter that a student is working on, another student is selected for interaction with the student.

21 Claims, 5 Drawing Sheets

(56) References Cited

U.S. PATENT DOCUMENTS

| | | | |
|---|---|---|---|
| 7,590,604 | B2 | 9/2009 | Geoghegan |
| 7,677,896 | B1 | 3/2010 | Sonwalkar |
| 7,849,043 | B2* | 12/2010 | Woolf et al. .................... 706/48 |
| 8,688,707 | B2* | 4/2014 | Marshall et al. ............. 707/740 |
| 2001/0031456 | A1 | 10/2001 | Cynaumon et al. |
| 2001/0049087 | A1 | 12/2001 | Hale |
| 2002/0049689 | A1 | 4/2002 | Venkatram |
| 2002/0081561 | A1 | 6/2002 | Skeans |
| 2002/0132217 | A1 | 9/2002 | Yonezu |
| 2002/0142278 | A1 | 10/2002 | Whitehurst et al. |
| 2002/0146676 | A1 | 10/2002 | Reynolds |
| 2002/0188583 | A1 | 12/2002 | Rukavina et al. |
| 2002/0192629 | A1 | 12/2002 | Shafrir |
| 2003/0003433 | A1 | 1/2003 | Carpenter et al. |
| 2003/0039948 | A1 | 2/2003 | Donahue |
| 2004/0014017 | A1 | 1/2004 | Lo |
| 2004/0018479 | A1 | 1/2004 | Pritchard et al. |
| 2004/0024569 | A1 | 2/2004 | Camilo |
| 2004/0063085 | A1 | 4/2004 | Ivanir |
| 2004/0161728 | A1 | 8/2004 | Benevento |
| 2004/0202987 | A1 | 10/2004 | Scheuring et al. |
| 2005/0026131 | A1 | 2/2005 | Elzinga et al. |
| 2005/0058978 | A1 | 3/2005 | Benevento |
| 2005/0186550 | A1 | 8/2005 | Gillani |
| 2006/0068367 | A1 | 3/2006 | Parke |
| 2006/0068368 | A1 | 3/2006 | Mohler |
| 2006/0188860 | A1 | 8/2006 | Morrison |
| 2006/0218225 | A1* | 9/2006 | Hee Voon et al. ........... 709/201 |
| 2006/0241988 | A1 | 10/2006 | Yaskin |
| 2007/0099161 | A1 | 5/2007 | Krebs et al. |
| 2007/0111188 | A1 | 5/2007 | Shell |
| 2007/0196807 | A1 | 8/2007 | Packard et al. |
| 2007/0202484 | A1 | 8/2007 | Toombs et al. |
| 2007/0203589 | A1 | 8/2007 | Flinn et al. |
| 2007/0218446 | A1* | 9/2007 | Smith et al. .................. 434/350 |
| 2007/0300174 | A1 | 12/2007 | Macbeth et al. |
| 2008/0014569 | A1 | 1/2008 | Holiday et al. |
| 2008/0131863 | A1 | 6/2008 | Stuppy |
| 2008/0134045 | A1 | 6/2008 | Fridman et al. |
| 2008/0222295 | A1* | 9/2008 | Robinson et al. ........... 709/227 |
| 2008/0254434 | A1 | 10/2008 | Calvert |
| 2008/0254438 | A1 | 10/2008 | Woolf et al. |
| 2009/0035733 | A1 | 2/2009 | Meitar et al. |
| 2009/0186329 | A1 | 7/2009 | Connor |
| 2009/0311657 | A1 | 12/2009 | Dodelson et al. |
| 2010/0035225 | A1 | 2/2010 | Kerfoot |
| 2010/0041007 | A1 | 2/2010 | Wang |
| 2010/0316986 | A1* | 12/2010 | de la Chica et al. ......... 434/362 |
| 2011/0010328 | A1 | 1/2011 | Patel et al. |
| 2011/0039249 | A1 | 2/2011 | Packard et al. |
| 2011/0126253 | A1* | 5/2011 | Roberts et al. ............... 725/114 |
| 2011/0177480 | A1 | 7/2011 | Menon et al. |
| 2011/0177483 | A1 | 7/2011 | Needham et al. |
| 2012/0164620 | A1 | 6/2012 | Needham |
| 2013/0095465 | A1 | 4/2013 | Menon et al. |
| 2013/0266922 | A1 | 10/2013 | Needham et al. |

OTHER PUBLICATIONS

U.S. Appl. No. 13/007,177, filed Jan. 14, 2011, Office Action, Sep. 3, 2014.
Mexican Institute of Industrial Property Patent Branch, "Examination Report" in application No. MX/a/2012/00206, dated May 16, 2014, 4 pages.
Claims in Mexican application No. MC/a/2012/008206, dated May 2014, 3 pages.
U.S. Appl. No. 13/408,937, filed Feb. 29, 2012, Office Action, Sep. 5, 2012.
U.S. Appl. No. 13/007,147, filed Jan. 14, 2011, Office Action, Sep. 10, 2012.
Canadian Intellectual Property Office, "Office Action", Canadian Application No. 2,787,133, dated Sep. 13, 2013, 2 pages.
Claims from Canadian Application No. 2,787,133, dated 09/132013, 19 pages.
U.S. Appl. No. 13/916,348, filed Jun. 12, 2013, Office Action, Sep. 30, 2014.
U.S. Appl. No. 13/409,006, filed Feb. 29, 2012, Office Action, Oct. 23, 2014.
Claims in Canadian Application No. 2,787,133, dated Oct. 2014, 23 pages.
Canadian Intellectual Property Office, "Search Report" in application No. 2,787,133, dated Oct. 21, 2014, 4 pages.
U.S. Appl. No. 13/007,147, filed Jan. 14, 2011, Office Action, Dec. 9, 2014.
European Patent Office, "Summons to Attend Oral Proceedings" in application No. 11702737.5-1958, dated Oct. 29, 2014, 4 pages.
Claims in European Application No. 11702737.5-1958, dated Oct. 2014, 3 pages.
U.S. Appl. No. 13/007,147, filed Jan. 14, 2011, Final Office Action, Jan. 25, 2013.
U.S. Appl. No. 13/408,937, filed Feb. 29, 2012, Final Office Action, Mar. 12, 2013.
The State Intellectual Property Office of the Peoples's Republic of China, "Notification of the 2nd Office Action" in application No. 201180011412.X, dated Jan. 16, 2015, 10 pages.
The State Intellectual Property Office of The People's Republic of China, "Notification of 2nd Office Action" in application No. 201180011412.X, dated Jan. 16, 2015, 7 pages.
Claims in China Application No. 201180011412.X, dated Jan. 2015, 6 pages.
Claim in Chinese Application No. 201180011412.X, dated Jan. 2015, 6 pages.
U.S. Appl. No. 13/007,147, filed Jan. 14, 2011, Final Office Action, Jan. 29, 2014.
U.S. Appl. No. 13/007,147, filed Jan. 14, 2011, Interview Summary, Apr. 2, 2013.
The Patent Office of the People's Republic of China, "Notification of 3rd Office Action" in application No. 201180011412.X, dated May 14, 2015, 5 pages.
Claims in China application No. 201180011412.X, dated May 2015, 9 pages.
U.S. Appl. No. 13/408,937, filed Feb. 29, 2012, Restriction Requirement, May 29, 2012.
U.S. Appl. No. 13/007,166, filed Jan. 14, 2011, Office Action, Dec. 7, 2012.
U.S. Appl. No. 13/007,177, filed Jan. 14, 2011, Office Action, Dec. 7, 2012.
U.S. Appl. No. 13/409,006, filed Feb. 29, 2012, Final Office Action, Nov. 21, 2012.
The State Intellectual Property Office of the People's Republic of China, "Notification of the First Office Action" in application No. 201180011412.X, dated May 30, 2014, 25 pages.
Claims in Chinese Application No. 201180011412.X, dated May 2014, 4 pages.
U.S. Appl. No. 13/007,147, filed Jan. 14, 2011, Office Action, Jul. 25, 2013.
U.S. Appl. No. 13/007,177, filed Jan. 14, 2011, Final Office Action, Aug. 6, 2013.
U.S. Appl. No. 13/007,147, filed Jan. 14, 2011, Examiners Answers, May 6, 2016.
U.S. Appl. No. 13/409,006, filed Feb. 29, 2012, Final Office Action, Aug. 12, 2015.
U.S. Appl. No. 13/916,348, filed Jun. 12, 2013, Office Action, Jan. 15, 2016.
U.S. Appl. No. 13/409,006, filed Feb. 29, 2012, Office Action, Feb. 26, 2016.
Menon, U.S. Appl. No. 13/409,006, filed Feb. 29, 2012, Final Office Action, Oct. 20, 2016.

* cited by examiner

FACILITATING TARGETED INTERACTION IN A NETWORKED LEARNING ENVIRONMENT

CROSS-REFERENCE TO RELATED APPLICATIONS; BENEFIT CLAIM

This application is a Continuation of Non-Provisional application Ser. No. 13/007,166 filed Jan. 14, 2011, now abandoned which claims benefit of both Provisional Appln. 61/295,635, filed Jan. 15, 2010 and Provisional Appln. 61/334,158, filed May 12, 2010, the entire contents of all of which are hereby incorporated by reference as if fully set forth herein, under 35 U.S.C. §119(e). This application is related to the following applications: (1) application Ser. No. 13/007,147, entitled "DYNAMICALLY RECOMMENDING LEARNING CONTENT," filed on Jan. 14, 2011, the entire contents of which is hereby incorporated by reference as if fully set forth herein; and (2) application Ser. No. 13/007,177, entitled "RECOMMENDING COMPETITIVE LEARNING OBJECTS," filed on Jan. 14, 2011, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to learning management systems. In particular, the present invention relates to platforms for individualized learning.

BACKGROUND

Intelligent learning systems are systems that attempt to assist students in achieving specific learning goals. To date, these systems have mainly used a computerized teaching approach that minors the approach taken in brick-and-mortar classrooms. Each student is presented with the same lecture, content, and assessment, regardless of learning style, intelligence, or cognitive characteristics.

Advances in intelligent learning systems have been limited to approaches such as "adaptive learning." These approaches are usually applied to logic-based topics such as mathematics, where the content that is served to each student is based on a pre-determined course-specific decision tree that is hard-coded into the system. If a first student and a second student each fail the same assessment by missing the same questions, both students will be presented with the same remedial materials as dictated by the decision tree.

Online courses are examples of "containers" that may employ adaptive learning technology to achieve a specific goal. For any given container, the adaptive learning technology used by the container is largely self-contained. That is, the adaptive learning technology employed by a container is programmed for a singular unchanging goal associated with the container.

For example, an adaptive learning tool may be designed to teach a student a course on the fundamentals of calculus. The designer of the tool will assume that the student possesses the foundational knowledge of mathematics required to begin the course, but the tool may provide a certain amount of "review" information as a means of calibration. In addition, the tool will not take into consideration the goals of any other course in which the student may be engaged. Instead, the tool will be designed to help the student achieve a particular level of proficiency in calculus. Once that level of efficiency is obtained by the student, the tool becomes useless. While data, such as assessment scores, may be saved, the core logic of the adaptive learning tool provides no additional benefit to the student unless the student decides to re-take the course or a portion of the course.

The illusion of adaptivity in "adaptive learning" tools is achieved by providing a dynamic experience for the student. This experience is based on the relationship between the assessment scores of the student and the pre-programmed hierarchy included in the tool. However, existing tools do not actually "adapt" to the student. Instead, by performing in a particular way, the student merely traverses down a pre-existing path through the tool's hierarchy.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
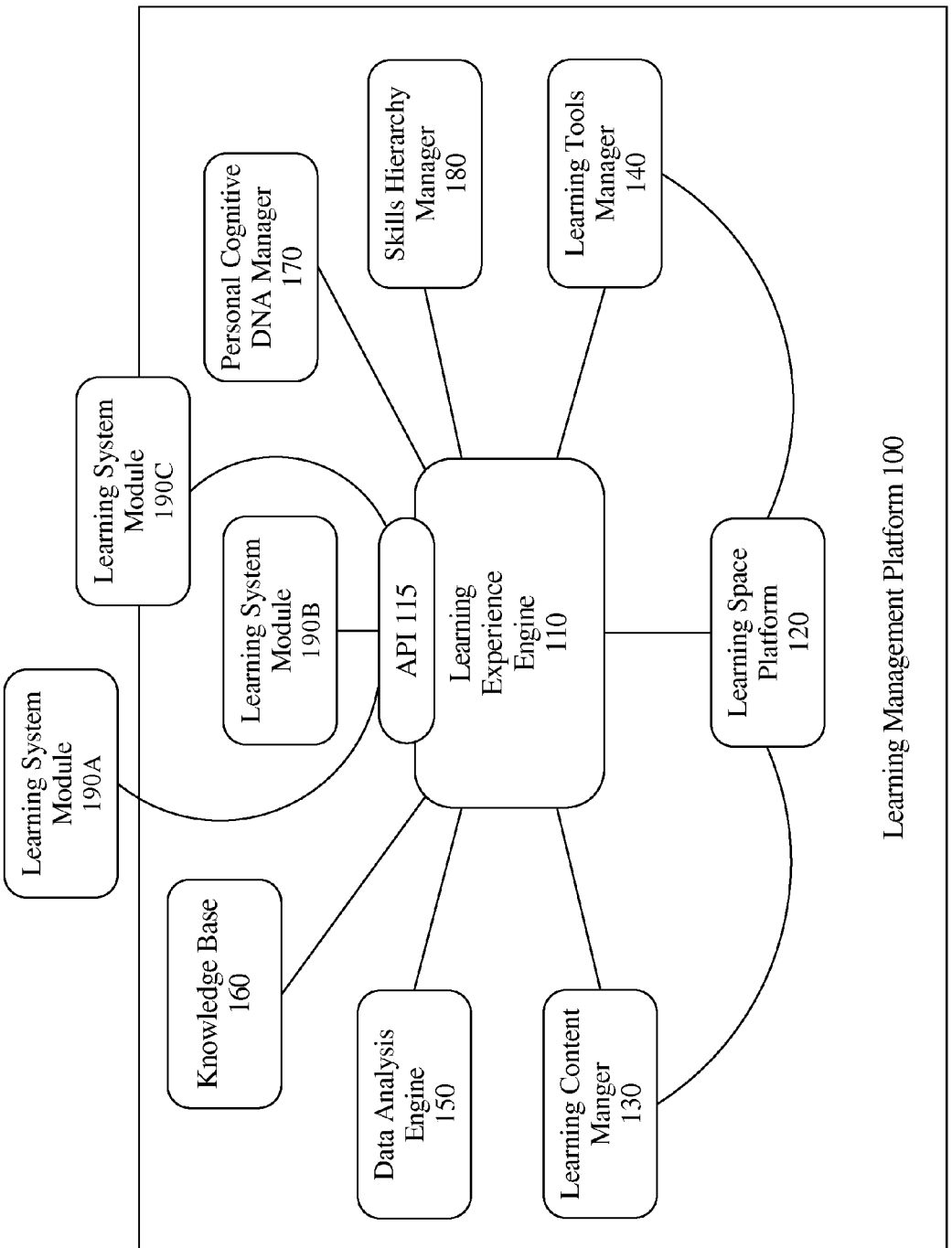
FIG. 1 is a block diagram illustrating a learning management platform on which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

It is common for students to take courses that provide too much information that the student already knows. On the other hand, it is also common for a student to complete a course in a sequence, only to be left behind in the next course in the sequence because the next course assumes knowledge that was not sufficiently covered in the earlier course. Students may also be required to take certain courses to complete a degree program, even if only a small portion of the skills learned in those courses pertain to the student's degree program. One way to ensure that students get the most out of their educational experiences is to personalize the educational experiences.

By using a learning management platform that employs the techniques described hereafter, students can receive personalized learning recommendations that identify specific content or learning objects that pertain to each individual student. In an embodiment, each learning object is associated with an individual skill and content associated with that skill, and a single course (i.e., Math 101) is comprised of many learning objects. Learning objects are organized in a hierarchy that is based on the skills associated with the learning objects. Learning objects can be made to compete with one another for a spot in the hierarchy so that the "best" learning object can be recommended more often.

In an embodiment, a learning management platform generates learning recommendations for students. The learning management platform implements multiple learning models and instructional strategies to guide a student throughout that student's academic journey in a way consistent with the student's cognitive characteristics and other attributes relevant to learning. The platform treats a student's journey as a life-long continuum and provides a set of powerful capabilities to serve the information necessary to support the student over time, even as the student's motivations and goals change. The learning management platform provides the "right outcome" for each student for a broad-based curriculum, and ultimately for each student's life-long learning goals.

If a student already possesses a particular skill, that student may proceed to learning a more advanced skill in the hierarchy, in an embodiment. If a student attempts to complete a learning object and does not succeed, the recommendation provided for that student includes a remedial learning objet to help prepare the student for another attempt at the first learning object. As different students attempt remediation in this way, the learning management platform learns which objects are good remediators for other objects.

In an embodiment, the student interacts with the learning management platform through a "learning space" platform, which may be a web-based application or an application being executed on one or more devices or computers associated with the student. The learning space platform defines the student's experience, and provides feedback to the learning management platform. The learning space platform makes a request to a learning experience engine. The request includes student profile information. Based on information associated with the student profile information, the learning experience engine provides an individualized learning recommendation. For example, an English major may receive a recommendation to learn from a particular learning object associated with the skill "using prepositions properly", using particular content associated with that object, such as a video or audio lecture associated with the skill.

In an embodiment, user profiles are compared with one another to identify students that are similar to one another. These similarities may help the learning management platform decide the best recommendation for a student. For example, if a student is similar to another student that successfully learned a particular skill using a particular learning object, then the particular learning object may be recommended. In addition, user profiles are be used to determine which users should interact with one another in online collaborative learning sessions.

Recommendations may also be based on the learning context of the student. In an embodiment, environmental and/or emotional circumstances associated with the student may alter the learning recommendation. For example, a learning object that requires a student to draw pictures may not be appropriate for a student using a mobile device with a small screen while riding a train.

In another embodiment, the individualized learning recommendation is based at least in part on a learning skills hierarchy. In an embodiment, the learning skills hierarchy is a hierarchical multidimensional directed graph that has, as nodes, learning objects associated with skills, assessments, and content.

Individualized Learning Recommendations

As used herein, the term "learning recommendation" refers to information, provided to a student or a device associated with a student, which provides educational direction. For example, a user that completes the course "Math 101" may be advised by a learning recommendation to begin the course "Math 102." Learning recommendations need not be limited to course recommendations, however. Instead, skills, content, tools, and activities may be recommended to a student with the goal of furthering the education of the student.

An individualized learning recommendation is a learning recommendation that is based on individual attributes of the student. For example, an individualized learning recommendation may take into account the type of learner a student classifies himself as. A student may receive recommendations to watch educational videos if the student identifies himself as a "visual" learner. However, if the same student performs poorly on assessments after studying with video content, but performs well on assessments after reading materials, then the learning platform may determine that the student's belief that he is a visual learner may be incorrect. In this case, future individualized learning recommendations may not include video content.

Individualized learning recommendations may be based on many types of information related to the student, such as past performance, interests, major, and various demographic information. These attributes may be compared with the attributes of other students that have had similar educational needs, and an individualized learning recommendation may be based on the success of similar students. For example, a first student may be required to learn integration as part of a course in Calculus. Different students, with similar attributes as the first student, that have successfully learned integration may provide insight into which content, tools, and activities will help the first student be successful in learning integration.

Structural Overview

FIG. 1 is a block diagram illustrating a learning management platform 100, according to an embodiment of the invention. Learning management platform 100 generally represents a set of one or more computer programs, and associated resources, configured to manage educational data and information about students, provide learning recommendations to students, and use information gathered from analyzing student interaction with the system to increase the effectiveness of future learning recommendations. Learning management platform 100 facilitates the delivery of information based on learning theories, models, and strategies. Learning management platform 100 includes logic that facilitates communication between its various components.

In the illustrated embodiment, learning management platform 100 includes a learning experience engine 110, a learning space platform 120, a learning content manager 130, a learning tools manager 140, a data analysis engine 150, a knowledge base 160, a personal cognitive DNA manager 170, a skills hierarchy manager 180, and learning system modules 190A-C. Each of these components of platform 100 shall be described in greater detail hereafter.

The Learning Experience Engine

Learning experience engine 110 generally represents a decision-making engine that interacts with all other components of learning management platform 100 and uses information gathered from these components to provide the best learning recommendation possible to students that interact with learning management platform 100. According to one embodiment, learning experience engine 110 includes learning recommendation logic configured to provide individualized learning recommendations based on information gathered from other elements of the learning management platform 100, such as knowledge base 160 and personal cognitive DNA manager 170.

Unlike conventional "adaptive learning" systems, learning experience engine 110 makes learning recommendations that are not based merely on traversal of a predetermined path that is based only on the student's degree program or class. Rather, learning experience engine 110 takes into consideration transient and non-transient profile attributes of each student. A transient profile attribute is any attribute that changes with relatively high frequency. A transient attribute may, for example, change simultaneously with environmental, physical or emotional circumstances associated with the corresponding user. Thus, the current location of a student would typically constitute a transient profile attribute. In contrast, a non-transient profile attribute is any attribute that changes rarely, if ever. Non-transient profile attributes include, for example, the birth date or home address of a student.

As an example of how learning experience engine 110 may make use of profile attributes, consider a situation in which a student may want to learn a skill, such as how to use gerunds in a sentence, while traveling on an airplane. Learning experience engine 110 may ask for the expected arrival time to determine how much time the student has left on the plane. Then, taking into account how much time the student has left on the plane, as well as attributes such as that student's learning style and habits, as well as the type of device that the student is using, learning experience engine 110 selects appropriate content, such as audio/video content and text content, for deliver to the student's device.

As the data that drives the decision-making process of the learning experience engine 110 evolves, the decisions made by learning experience engine 100 become more accurate. Students may receive hundreds of learning recommendations over time. As students perform activities and take an assessments associated with recommendations, data associated with each student is updated to reflect the types of activities that work well for each student, the strengths and weaknesses of the student, and other useful education-related attributes of the students.

As used herein, the term "education-related attributes" refers to any attributes that relate to a student's learning history, goals or abilities. As shall be described in greater detail below, education-related attributes may include non-transient attributes, such as a student's prior classes and grades, and transient attributes such as a student's current mood.

As more data is collected, patterns emerge, and learning experience engine 110 can provide individualized learning recommendations with a high degree of confidence in the expected success of each student. For example, it may become clear that a particular student performs poorly when he tries to learn skills using only audio content, even though that student has expressed a preference for audio content. In this case, learning experience engine 110 may subsequently require content other than audio content to be delivered to the user, instead of or in addition to audio content.

Other types of data that may be used in determining individualized learning recommendations are discussed herein. Rules defining the use of this data may be used to configure the learning experience engine 110. In addition, weights, confidence metrics, and other measurements of data importance and accuracy may be assigned to any type of data discussed herein, and these measurements may be taken into consideration in the rules that define the use of the data by learning experience engine 100.

In one embodiment, learning experience engine 110 communicates and shares information with other elements of the learning management platform 100. For example, data analysis engine 150 may not be directly communicatively coupled to skills hierarchy manager 180 in an embodiment. In an embodiment where data analysis engine 150 and skills hierarchy manager 180 do not directly communicate with each other, communication between data analysis engine 150 and skills hierarchy manager 180 may nevertheless be carried out using learning experience engine 110 as an intermediary in the communication operation.

In other embodiments, other elements of the learning management platform 100 may be directly communicatively coupled to one another, and communication does not require the use of the learning experience engine 110 as an intermediary. For example, personal cognitive DNA manager 170 may directly communicate with knowledge base 160.

The Learning Space Platform

Learning space platform 120 represents the user interface that the student sees when interacting with learning management platform 100. Learning space platform 120 also includes logic that is specific to the device on which learning space platform 120 resides. Learning space platform 120 includes logic configured to interact with other elements of learning management platform 100. For example, learning space platform 120 may receive a learning recommendation from learning experience engine 110, and based on this learning recommendation, learning space platform 120 may request content from learning content manager 130 and tools from learning tools manager 140. While the tools themselves can be "plugged into" the Learning Space using various interoperability standards in existence (such as IMS's Learning Tools Interoperability standard or the web's Open Social standard) and single sign-on techniques, the learning space platform 120 provides the experience recommended to complete the tasks a student needs to master in order to meet their next outcome by facilitating the delivery of learning content using appropriate tools.

Learning space platform 120 resides on a client computing device, in an embodiment. A client computing device includes any device capable of presenting a user with learning information, such as a personal computer, mobile computing device, set-top box, or network based appliance. In other embodiments, learning space platform 120 resides on a terminal server, web server, or any other remote location that allows a user to interact with learning space platform 120. For example, learning space platform 120 may be a web-based interface included in learning experience engine 110.

Learning space platform 120 is used to make "local" decisions about the student experience, in an embodiment. For example, learning space platform 120 may be an iPhone application detects the location of the student or asks for feedback from the student, such as feedback related to the student's mood. The location data and mood data may then be used to determine the best learning experience. Local decisions may also be based on the screen size or other attributes of the device on which the learning space platform 120 resides. For example, learning experience engine 110 may deliver a variety of learning content to the student. After the content has been received, learning space platform 120 decides which content to display, and how to display it, taking into consideration screen size, stability of Internet connection, or local preferences set by the student. In an embodiment, the decisions discussed above may be made by learning experience engine 110.

In addition, learning space platform 120 may provide detailed user and time-specific transient data to learning experience engine 110, in an embodiment. For example, the current location of the user may be provided by learning space platform 120 to learning experience engine 110, which stores the data and uses it as input for learning recommendation decisions. As another example, the learning space platform 120 may communicate the current speed at which the user is moving, thereby allowing the learning experience engine 110 to make recommendations based on whether the user is stationary (e.g. at a desk), or travelling (e.g. in a car, bus or train). For example, learning experience engine 110 may refrain from sending tests to a user during periods in which the learning space platform 120 is providing information that indicates that the user is travelling.

As additional examples, a particular type of mobile computing device may not possess the ability to install a particular tool, such as a flash plug-in. Further, the device may currently be low on battery power, making a learning mode that requires less screen use more desirable, or even the only option. The size of the computing device's screen may also be considered when making a content recommendation. For example, a collaborative tool, such as a chat session or shared whiteboard system, may require a larger screen to be effective, and thus may not be appropriate for a mobile computing environment.

The tool (e.g. a cognitive tutor) selected to deliver content to the user may or may not be aware of the student's cognitive DNA—it is the responsibility of the learning space platform 120 to launch the tool with the appropriate configurations for customization supported by the tool. Advanced tools or newly created tools on the platform may choose to use the information on the cognitive DNA in order to personalize the experience.

The Learning Content Manager

Learning content manager 130 stores and manages learning content. Learning content includes any content that may be used to learn a skill Examples of learning content include text, audio files such as mp3 files, video files such as QuickTime files, interactive flash movies, or any other type of multimedia content.

In an embodiment, learning content manager 130 includes a content repository and a content categorization system for storing and organizing learning content. The content repository stores content in non-volatile memory, such as a shared hard disk system. The content categorization system provides content indexing services, along with an interface for creating and associating metadata with content stored in the content repository.

Content may be associated with metadata that describes the content. This metadata assists course developers in determining which content may be appropriate for learning particular skills. For example, metadata associated with a video may include a title attribute that includes the text "how to factor polynomials." Other attributes may include a general category, such as "math" and a content type, such as "QuickTime video. Metadata may be embedded within the content being described by the metadata, may be in a separate Meta file such as an XML file that is associated with the content being described, or may be stored in a database with an association to the content being described.

Learning content manager 130 also includes content delivery logic configured to manage requests for content that is stored in the content repository. For example, some content may be streamed in order to preserve bandwidth. In some cases, it makes sense to deliver all required content for a particular course at the same time, such as when the student expects to be without Internet access for an extended period of time. Thus, learning content manager 130 may be directed by learning experience engine 110 to deliver content in a particular way, depending on attributes of the student. In addition, certain content formats may not be supported by certain devices. For example, content delivery logic may choose or even change the format of the content being delivered if the device requesting the content does not support a particular format, such as the flash format.

The types of content and tools that may be used with learning management platform 100 are not limited to those discussed herein. Instead, the examples provided are meant to serve as possible types of content and tools that may be used, and are non-limiting examples.

The Learning Tools Manager

Learning tools represent software required for delivery of learning content. Learning tools may include, for example, video players, virtual whiteboard systems, video chat software, and web browsers. A web browser plug-in may also be a learning tool. Each of these tools may be required in order for the student to view the recommended content. For example, a recommended piece of content may consist of a flash movie. A flash movie, in order to be played, requires a flash player to be invoked by the learning space platform 120 running on the student's client computing system. Another example of a learning tool may be a game system.

Learning tools manager 140 manages and organizes learning tools. In an embodiment, learning tools manager 140 includes a tool information database, a tool repository, tool selection logic, and tool delivery logic.

The tool information database includes information about each learning tool, such as whether or not the tool will work with a particular type of client, such as a handheld device. For example, a flash player may not work on some mobile devices. Other information in the tool information database may include information, such as network location information, that enables learning space platform 120 invoke the download of a tool that is not stored in the tool repository. For example, a URL of a required tool, which may not be stored in the repository, may be provided to a student, along with a prompt to download the tool.

The tool repository provides storage for downloadable tools. In an embodiment, tool selection logic may assist learning space platform 120 in selecting a tool that is appropriate for a particular client device. For example, tool selection logic may determine that a particular media player, such as a video player or browser plugin, is required in order to view content that has been suggested to the student. Tool selection logic may determine that the student is using an Apple Macintosh computer, and provide the version of the tool that runs on Apple machines for download. In addition, tool selection logic may determine that no tool that plays the suggested media is available for the platform. Tool selection logic may then report this to learning experience engine 110, which will make a new content recommendation in an embodiment.

Tool delivery logic is configured to manage requests for tools that are stored in the tool repository. For example, a student may require a tool that takes a significant time to download. Tool delivery logic may break up the tool into smaller parts for separate download in order to ensure successful delivery of the tool in the case of a lost connection. In addition, tool delivery logic may interact with a download manager in the learning space platform 120.

The Data Analysis Engine

Data analysis engine 150 performs a detailed analysis all information gathered by other elements of the learning management platform 100 in order to identify correlations between student attributes and learning experiences. For example, changes in user profile information, assessment results, user behavior patterns, clickstream data, learning evolution information, resource monitoring information, or any other type of information available may be analyzed by data analysis engine 150. Data need not be structured in a particular way to be analyzed, and multiple sources of data may be analyzed in real time. In addition, multiple data sources may be aggregated, even if each source provides data in a different format or structure. The aggregated data may then be filtered to provide a detailed cross platform analysis on specific data relationships.

Data analysis engine 150 may analyze profile information to determine groups of users that are similar to one another. In addition, data analysis engine 150 may determine the times of day, locations, and other transient attributes that are associated with a high degree of success for a student. For example, based on results of assessments taken at different times of the day, data analysis engine 150 may determine that a particular student studies more effectively between the 9 am and 11 am in the morning, and that the positive effect is magnified when the student studies at a particular bookstore in town. Any attribute may be studied by data analysis engine 150 to determine correlations between student attributes and learning effectiveness.

In an embodiment, data analysis engine 150 operates in a clustered computing environment, using existing software, such as Hadoop by the Apache Hadoop project. In other embodiments, custom implementations of Hadoop or other software may be used, or a completely custom data analysis system may be used. Data analysis engine 150 includes reporting logic configured to provide detailed reports to learning experience engine 110. These reports assist learning experience engine 110 in making learning recommendations.

The Knowledge Base

Knowledge Base 160 manages persistent data and persistently stores snapshots of certain transient data. For example, student categorization information, student study group information, cognitive DNA relationship information, and persistent student profile information may all be stored in knowledge base 160. Although this data is persistently stored, the data may change as required by other elements of the learning management platform 100. For example, data analysis engine 150 may provide a report to learning experience engine 110 that causes learning experience engine 110 to indicate to knowledge base 160, based on the report, that student categorization information for a particular student should be changed. Knowledge base 160 will then alter the persistent data to reflect the indicated change. In an embodiment, knowledge base 160 includes a relational database management system to facilitate the storage and retrieval of data. Knowledge base 160 is communicatively coupled to learning experience engine 110, and provides learning experience engine 110 with student information to assist in creating an individualized learning recommendation.

The Personal Cognitive DNA Manager

Personal cognitive DNA manager 170 manages data associated with students. A collection of data associated with a student is known as personal cognitive DNA (PDNA). The portions of a PDNA that are stored at the personal cognitive DNA manager 170 may be transient data, while persistent portions of the PDNA may be stored in knowledge base 160. PDNA data stored in personal cognitive DNA manager 170 may also include references to persistent data stored in knowledge base 160. Personal cognitive DNA manager 170 may include a database management system, and may manage PDNA for all students. In an embodiment, instances of personal cognitive DNA manager 170 may reside on the client computing devices of students, and may be part of the learning space platform 120. In this embodiment, PDNA for users of the client computing device or the associated learning space platform 120 may be stored in volatile or non-volatile memory. A combination of these embodiments may also be used, where a portion of the personal cognitive DNA manager 170 resides on a client while another portion resides on one or more servers. Personal cognitive DNA manager 170 is communicatively coupled to learning experience engine 110, and provides learning experience engine 110 with transitory student information to assist in creating an individualized learning recommendation. For example, a user's location, local time, client device type, or client operating system may be provided to learning experience engine 110 to assist in determining what type of content is appropriate for the environment and device. In an embodiment, personal cognitive DNA manager 170 and knowledge base 160 may be combined.

Learning Objects

Figure 3:
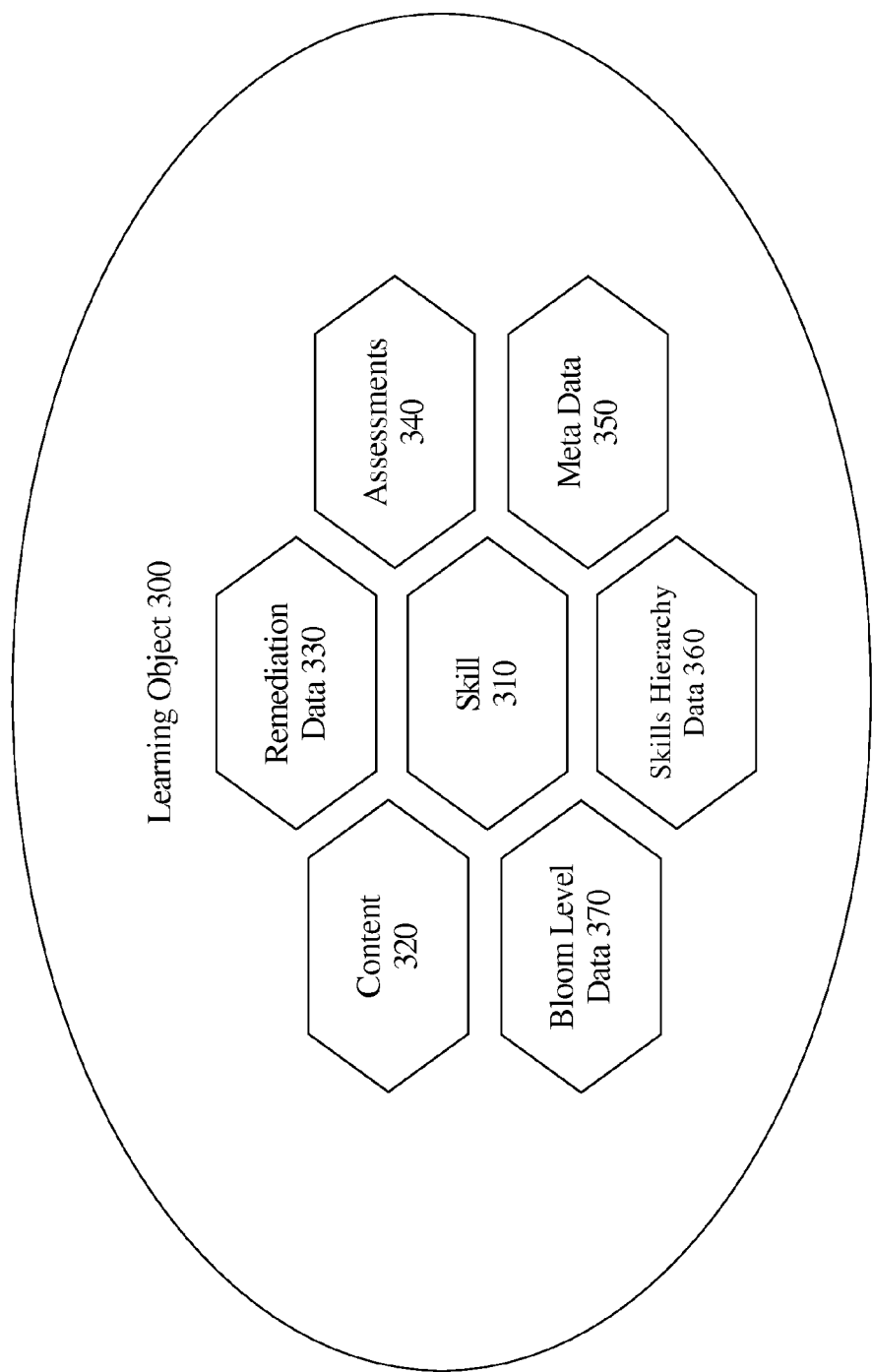
FIG. 3 is a block diagram illustrating a learning object in an embodiment.

FIG. 3 is a block diagram illustrating a learning object in an embodiment. A learning object such as learning object 300 is associated with data that describes that learning object. The associated data may be stored in a learning object data structure. In an embodiment, a learning object is referenced by a learning object identifier, and associated data or references to the associated data may be stored in a relational database, and may reference the identifier to indicate that the data is associated with the learning object represented by the identifier.

Each learning object includes a skill, such as skill 310. A skill represents an ability that a student is meant to acquire. For example, a skill may represent the ability to perform addition of single-digit numbers, form a complete sentence using a particular language, or type a certain number of words-per-minute. There is no limit to the complexity or simplicity of skills that may be included in a learning object.

Each learning object includes content, such as content 320. As shall be described in greater detail hereafter, the content of a learning object may include, by way of example and not by way of limitation, assessments, remediation data, skills hierarchy data, bloom level data, learning object metadata, and object-specific personalized data.

Content is said to be "included" as part of a learning object, even though the content may only be referenced by the learning object, but may not actually be stored within a learning object data structure. Content may be stored in a content repository and managed by learning content manager 130. In an embodiment, content is "tagged" with metadata describing the content, such as keywords, skills, associated learning objects, the types of learners (e.g. visual) that may benefit from the content, the type of content (e.g. video or text), and statistical information regarding the content usage. Learning space platform 120 and learning experience engine 110 may be authorized to add, remove, or alter tags associated with content via the learning content manager 130.

Skills Hierarchy

Figure 2:
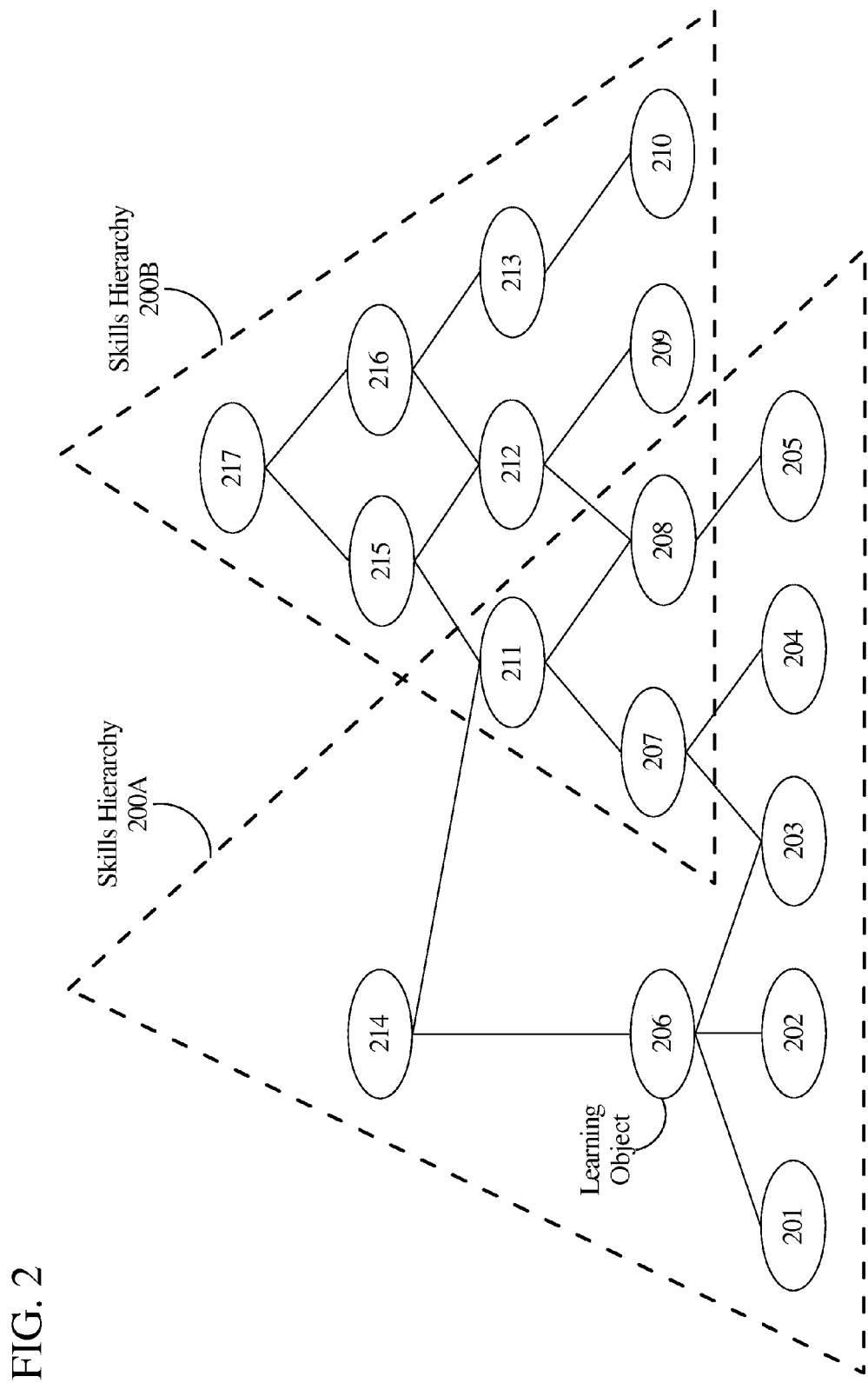
FIG. 2 is a block diagram illustrating a skills hierarchy structure that may be used in an embodiment.

Recommendations generated by learning experience engine 110 are based in part on a skills hierarchy having learning objects in an embodiment. FIG. 2 is a block diagram illustrating a skills hierarchy structure that may be used in an embodiment. Skills hierarchy 200A includes learning objects 201-208, 211, and 214. Skills hierarchy 200B includes learning objects 207-213 and 215-217. A skills hierarchy may represent a group of skills, a portion of a course, a course, a field of study, a certificate program, a degree program, an individual competency map that represents the skills acquired by a student, or any other education related structure. Skills hierarchies may be mapped to a wide variety of various learning theories, content types, and modes.

Links between objects in the hierarchy represent the relationship between those objects. For example, a link between two learning objects may mean that the subject matter covered in one of the learning objects builds on the subject matter covered in the other learning object. A different link may indicate that one learning object is a prerequisite of the other.

Certain skills may be required in order to begin learning more advanced skills According to skills hierarchy 200A for example, the skill associated with learning object 205 must be acquired before advancing to the skill associated with learning object 208. In this way, the learning skills hierarchy is hierarchical. However, a non-hierarchical approach may be used in an embodiment. For example, a non-hierarchical directed-graph approach may be used in an embodiment that is based on a different learning model.

The Skills Hierarchy Manager

Skills hierarchy manager 180 manages skills hierarchy information that describes the relationships between skills. For example, a student may be required to learn how to add and subtract before he learns how to multiply and divide. A complete skills hierarchy may be made up of smaller interconnected skills hierarchies that represent smaller groups of skills, which may represent all of the skill required to complete a traditional educational course or degree program. The nodes in the hierarchy correspond to learning objects. Since a single node may be considered a prerequisite for many other nodes, and many nodes may be prerequisites for a single node, the hierarchy may be multidimensional.

Skills hierarchy manager 180 manages the relationships between learning objects. For example, a relational database may be used to keep track of the node dependency information. Skills hierarchy manager 180 also stores object-specific data that describes skills, remediation information, assessment information, skills hierarchy association information, learning theory information, content information, tools information, and other metadata associated with learning objects. Skills hierarchy manager 180 interfaces with learning experience engine 110 and provides learning experience engine 110 with skills hierarchy data to assist learning experience engine 110 in creating an individualized learning recommendation. The skills hierarchy information provided to learning experience engine 110 may include whole or partial skills hierarchies, and object-specific data may be filtered according to parameters passed to the skills hierarchy manager 180 in a request from learning experience engine 110.

Learning Theories, Models, and Strategies

Learning theories address how people learn by providing a paradigm through which to view a learning objective. Although theories are abundant, three well-understood theories are behaviorism, constructivism, and cognitivism. Behaviorism is a view that is based on the assumption that people learn based on stimulation. Positive or negative reinforcement shapes the behavior of the student. Constructivism is a view that assumes that the student learns as an experience, and that the learner actually constructs information. Cognitivism is a view that assumes that people process information, and do not merely react to stimulation.

Learning models are created based on learning theories, and are meant to operationalize one or more learning theories. Different instructional strategies may be used, depending on the model to be implemented. Techniques include lecturing, case study, collaboration, one-on-one, direct instruction, and indirect instruction. Content and tools that facilitate the delivery of content can be used to implement instructional strategies. Examples of content include text, video, audio, and games. Examples of tools include video players, browser plug-ins, e-book readers, shared whiteboard systems, and chat systems. Many other examples of content and tools exist.

The theories and models together have been created to classify, adapt and guide the process of educating a student, taking into consideration the characteristics of the student that are pertinent for learning. To date, learning models have been implemented in application "silos" where each application implemented a specific model (e.g. intelligent tutors), catering to very specific topics that suited the model's flat hierarchy based algorithms, typically for logical subjects such as mathematics. These types of applications have limited use in broad-based education, such as a 4-year degree program or inter-disciplinary subjects such as Economics, and Marketing.

The Learning Modules

Learning modules can be optionally integrated into learning management platform 100, in an embodiment. Learning modules generally represent third-party applications or stand-alone applications with decision-making capabilities.

In an embodiment, learning experience engine 110 may request input from a learning module such as learning module 190A, and then take the input into consideration in making the overall learning recommendation decision. For example, learning module 190A may recommend that a first content item be delivered to a student. Learning experience engine 110 may then determine that the first content item should not be provided to the student for reasons that learning module 190A is unable to consider, so learning experience engine 110 may recommend a similar content item, such as an item in a text format rather than an audio format.

Learning system modules 190A, 190B, and 190C provide additional functionality to learning management platform 100, and may be based on models other than those described herein. Application Programming Interface (API) 115 provides a programming interface for learning system modules such as learning system modules 190A, 190B, and 190C. Learning system modules 190A, 190B, and 190C are communicatively coupled to learning experience engine 110 via API 115, and also may be communicatively coupled to other elements of learning management platform 100, such as learning content manager 130. Learning system modules 190A, 190B, and 190C may include third party or custom systems, hardware, or software modules.

Personal Cognitive DNA

In an embodiment, learning models and theories may be operationalized using each student's PDNA to create an individualized learning experience for students. Although PDNA is referred to herein as "personal cognitive DNA," this label does not indicate that PDNA data collection and usage is limited to embodiments that are based upon cognitive models. PDNA data includes information about a student's cognitive strengths and weaknesses (as well as preferences) that are provided explicitly by the student or inferred by the system as the student interacts with the system and the outcomes are measured.

PDNA may be used in any embodiment, independent of any particular learning model. PDNA data is a collection of data associated with a student. Transient profile data may be stored in the personal cognitive DNA manager 170, while persistent profile data may be stored in knowledge base 160. PDNA data stored in personal cognitive DNA manager 170 may include references to persistent data directly or indirectly associated with the student that is stored in knowledge base 160.

In order to provide the right experiences to the student, in addition to the proper tools and models, the system must collect and maintain a dynamically updating rich data layer to support predictive education models. A rich data layer generally refers to information that is gathered and linked to create intelligence that may be used to inform learning experience engine 110, which uses this information to generate learning recommendations. In one embodiment, the rich data layer is dynamically updating in that the data being collected changes over time, and data that does not conform to the changes becomes incorrect. For example, as a student achieves a high degree of proficiency with a particular skill, data that suggests that the student needs to become proficient with the skill becomes outdated and incorrect. Thus, the dynamic data layer must keep up with the current information available for each student.

Each student using learning management platform 100 is associated with PDNA for that student. When a student is new to the system, the PDNA for that student may contain minimal information, such as demographic information, a student's declared major, self-proclaimed learning style preferences, and imported transcript data such as grades and coursework done at other institutions. However, as the student begins using the learning management platform 100, vast amounts of data may be collected and analyzed by data analysis engine 150, resulting in new PDNA information that describes how the student learns, what level the student has achieved in a particular course, whether the student understands a particular concept or possesses a particular skill, the pace at which the student learns, or even the time of day the student is most likely to correctly answer a question.

Many of these student attributes change over time, but may still be considered persistent based on the frequency of change. For example, a student may initially be a visual learner, but may later learn more efficiently by reading text-based material. Other student attributes may be more transient in nature. For example, the PDNA may include data that identifies the student's current location, what client computing device they are using (e.g. iPhone, laptop, or netbook), what operating system they are using, whether or not their web browser supports the Flash plug-in, or whether the student sets his status as "tired."

It may be the case that a particular student performs differently depending on environmental factors, while another student may be capable of learning regardless of the environment. For example, one student may be able to study on a commuter train while another may not. One student may be capable of learning via an audio program while another requires text information or video. In addition, certain tasks may be reserved for particular times or places in order to calibrate the system. For example, the system may be configured to only offer assessments when a student's transient PDNA data shows that the time in the student's current time zone is between certain daylight hours.

Metrics may be assigned to particular attributes in each student's PDNA. For example, metrics may describe expected or historical success with different learning styles. These metrics may help learning experience engine 110 determine whether the student is successful when participating in collaborative learning exercises, or whether the student would benefit more from self-study. A student may have a metric of "7" for the attribute "visual learner" and a metric of "2" for the "audio learner" attribute. Higher scores are not necessarily the only factor used in determining the learning strategy for the student, however. For example, the learning track that the student is on may actually require that the student develop listening skills. Therefore, the learning experience engine 110 may recommend a learning experience for the student that will bolster his ability to learn via audio. In other words, the system will teach the student the underlying skills required to allow the student to become a successful audio learner.

PDNA for a particular student may be analyzed and compared to PDNA of other students to make learning experience predictions. For example, data analysis engine 150 may analyze the PDNA information for all students in the system, over time, to predict various things, including: what method of learning is best for each student, which track will yield the highest chance of success for a given student in a particular program, which programs the student would be successful in, which courses the student may be expected to struggle with, and even which career would best suit the student.

Snapshots and Learning Intervals

As students use learning management platform 100 to manage their learning needs, natural checkpoints emerge from the data. The frequency of these checkpoints can be adjusted by system administrators, but are generally related to a level of achievement reached by the student for which the checkpoint was generated. For example, a checkpoint may be generated for a student each time that student successfully demonstrates a skill associated with a learning object.

In an embodiment, snapshots of personal cognitive DNA information are taken at each checkpoint. A snapshot is a static record of PDNA as it existed at the time of the checkpoint. Each snapshot is stored in a temporal database or other data storage mechanism, such as knowledge base 160.

Since a new snapshot can be taken for each learning interval (the time between checkpoints), the PDNA information stored in the snapshot may be used by learning experience engine 110 to formulate recommendations for other students that may have personal cognitive DNA that is similar to the snapshot.

DNA Fingerprints

An analysis of hundreds, thousands, or even larger numbers PDNA data sets yields statistically valid cognitive DNA "fingerprints", in an embodiment. A DNA fingerprint is based on aggregate PDNA data, which may include PDNA snapshots. Generally, a DNA fingerprint is made by selecting a set of PDNA data having one or more PDNA attributes in common and generating a single profile that is representative of the entire set.

For example, a DNA fingerprint may be generated for students that have recently completed a learning object that teaches the calculus skill of taking the derivative of a second degree polynomial. The recency of the completion of the learning object is determined based on the time that the data was stored, so snapshots that were taken at checkpoints occurring immediately after students completed the learning object will qualify for inclusion in the set of PDNA data considered for use in the creation of the DNA fingerprint. Each attribute in the PDNA data considered in the creation of the DNA fingerprint may be aggregated, averaged, or otherwise considered, resulting in a fingerprint of that attribute. For example, if the average value of the attribute "abstract learning ability" is "80" in the PDNA data in the set, then the DNA fingerprint may inherit this value for the same attribute. Any method of considering or combining PDNA data to generate DNA fingerprint data may be used. For example, the lowest value, the median value, or a sum of the values may be used as the fingerprint value for a particular attribute. Some attributes, especially those with very little correlation to the common PDNA attribute, may not be assigned a DNA fingerprint value, or may be assigned a NULL value, indicating that conclusions about that attribute are statistically invalid for that set of PDNA. Once each attribute has been considered for the set, then the resulting values for each attribute are stored in one or more records as a DNA fingerprint for that set of PDNA data.

Using Snapshots and DNA Fingerprints to make Learning Recommendations

A database of snapshots and DNA fingerprints may be used to shorten learning experience engine 110 recommendation decision making time by matching a student's PDNA with a pre-existing DNA fingerprint.

Because fingerprints are based on snapshots, some PDNA data used to generate the matching fingerprint may have already advanced far beyond the stage when the snapshot was taken. For example, a snapshot that was taken two years ago may be used in the creation of a DNA fingerprint. The attributes of the PDNA that change over time, such as those that are based on location or "last learning object completed," may be reflected in the fingerprint, but not in the current PDNA of the student or students whose data was used to create the fingerprint. Because of this, a student whose current PDNA has a high correlation with a fingerprint that is based on an old PDNA snapshot of another student may be considered similar to an "old" version of that other student.

If fingerprint PDNA data indicates that students having a particular attribute progressed at a particular rate or excelled in a particular subject, it may be assumed that students with a matching PDNA will experience the same success. As time goes on, students associated with the PDNA data upon which a fingerprint is based may become less and less alike, and the diversion of some attributes of the fingerprint may result in less valid prediction information if a fingerprint were to be based on the same set of students, but using snapshots associated with subsequent checkpoints. However, recommendations that are based on a comparison between a student's current PDNA and fingerprints based on sets of PDNA data having the same values for attributes as the student's current PDNA will be highly accurate. The student's PDNA may be matched to a new fingerprint whenever necessary, desired, or requested.

Learning recommendations generated by learning experience engine 110 are not limited to suggesting which course a student should take next. A student's PDNA may be used to make very specific recommendations based on a determination that the student is cognitively similar to one or more other students. The fingerprint method described above may be used, matching the student based on student grouping criteria that is stored in knowledge base 160. In addition, any other matching technique may be used.

An individualized learning experience for each student may be achieved by providing real-time recommendations based on predictive information associated with cognitively similar students. When a first student is no longer cognitively similar to a second student, the second student's profile is no longer considered when selecting which learning recommendations to give to the first student. Thus, while a short portion of the learning experience, such as learning a particular concept or skill required for a portion of a course, may be similar to the experience of others, students may complete an overall learning program of study by taking a completely unique path with respect to other students.

Temporal Fingerprint Paths

A temporal fingerprint path generally refers to a series of DNA fingerprints that are generated based on the same set of students. For example, consider a situation in which a PDNA snapshot for Lenny Learner that was taken one year ago was used in the fingerprint creation process of a particular fingerprint. All PDNA sets used in the particular fingerprint, including Lenny's, may then be analyzed for subsequent snapshot information to create a temporal fingerprint path.

In an embodiment, each fingerprint that is part of a temporal fingerprint path may be based on snapshots that are not associated with the same "time." Instead, each fingerprint may be based on a series of snapshots for each user in the set of users used to generate the fingerprint without respect to the time the snapshots were taken. For example, Lenny Learner and Laura Learner may each be associated with PDNA information used in generating a temporal fingerprint path that includes five fingerprints. The snapshots associated with Lenny that are used to generate the five fingerprints may have been generated over a period of five years, starting seven years ago. The snapshots associated with Laura that are used to generate the five fingerprints may have been generated over a period of two years, starting three years ago. In this embodiment, the temporal fingerprint path may be designed to represent progression through a series of learning objects, with Lenny and Laura being chosen based on their involvement with the same learning objects.

In another embodiment, a temporal fingerprint path may be more strictly based on time. For example, the snapshots associated with Lenny that are used to generate the five fingerprints may have been generated over a period of exactly two years, starting seven years ago, and the snapshots associated with Laura may have been generated over a period of exactly two years, starting three years ago. Thus, the length of time from the beginning of the fingerprint path is given added importance.

However, snapshots for a particular student occurring earlier than snapshots for that student that are used in generating a first fingerprint are unlikely to be used in the generation of a second fingerprint in a temporal fingerprint path. A temporal fingerprint path generally implies progression, so a subsequent snapshot for that user would likely be selected to use in generation of subsequent fingerprints.

Temporal fingerprints are particularly useful in generating long-term learning strategies for students that are enrolled in a degree or certification program that has specific requirements. This is particularly true for students for which very little PDNA information has been gathered. For example, a student may have no history with the system, but may be enrolled in a Computer Science degree program. A temporal fingerprint path may be generated based on the set of students that have completed the Computer Science degree program. Based on the temporal fingerprint path, learning experience engine may provide an expected long-term learning strategy to the student. As more students progress through the Computer Science degree program, the set of students considered for generating a temporal fingerprint path for the program may change, altering the temporal fingerprint path. For example, the set of students considered for generating a temporal fingerprint path may be based only on students that have completed the Computer Science degree program within the last five years in an embodiment.

Other factors may also be considered when selecting the set of students that are used to generate a temporal fingerprint path. For example, degree programs change over time, and today's students may need to acquire different skills than yesterday's students to complete the Computer Science degree program. Thus, in another embodiment, only students in the same "version" of the Computer Science degree program are considered when creating a temporal fingerprint path for a particular student.

Content Feedback Interface

Figure 4:
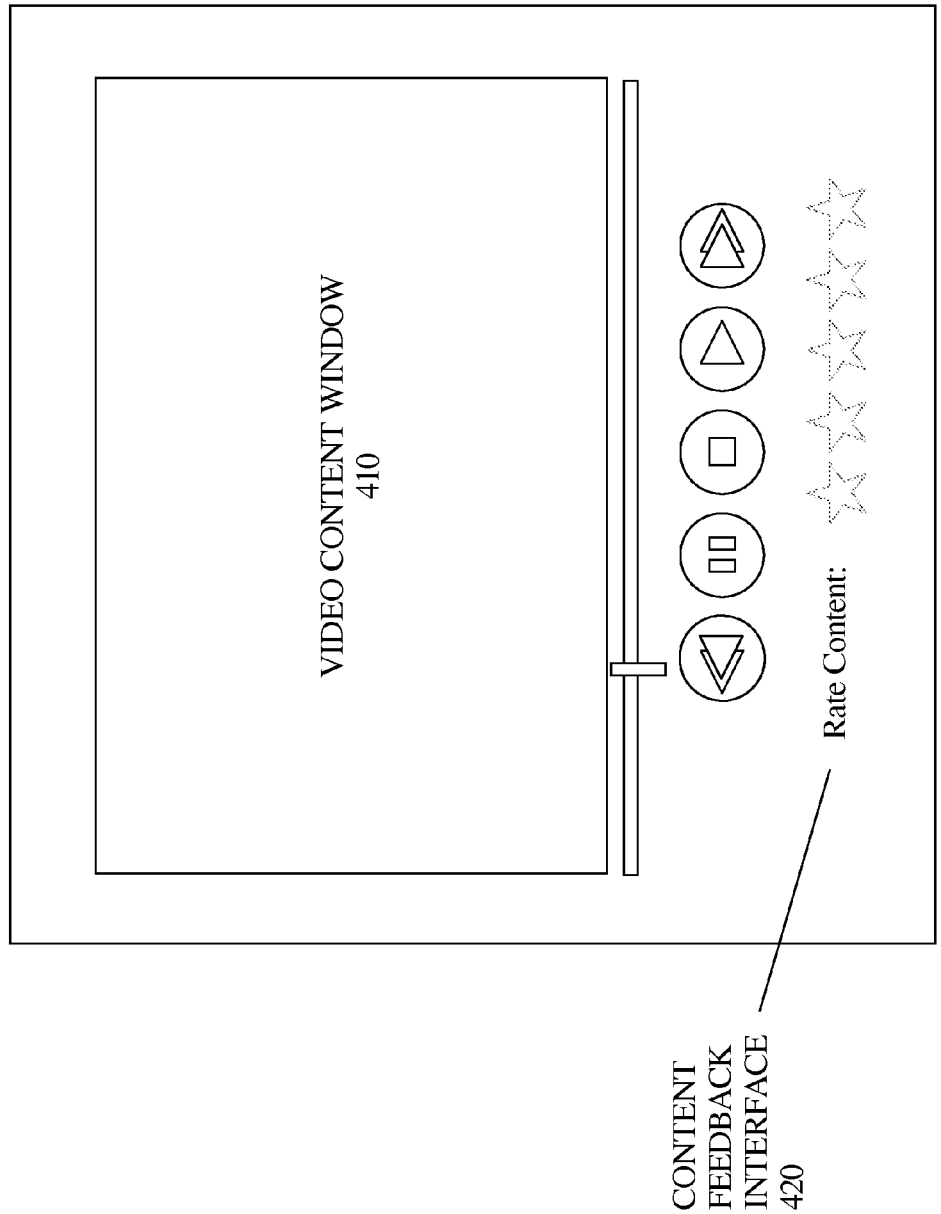
FIG. 4 illustrates a content feedback interface in an embodiment.

A content feedback interface may be provided with learning space platform 120. FIG. 4 illustrates a browser window 400 with a video content window 410 and a content feedback interface 420 in an embodiment. By selecting a number of "stars," a student may indicate her overall satisfaction with the content displayed in video content window 410. The content feedback interface allows students to provide feedback about the content, and whether or not the content or the tool that enables the content was appropriate for the situation in which it was used.

In addition to the features described with respect to FIG. 4, a content feedback interface may allow users to rate content based on many factors, such as whether they found the content convenient, easy to understand, appropriate as a next step to the previous content used, or whether the student likes the content. Text entry fields and other interface elements may be used as appropriate for gathering additional feedback data from students.

All of the content feedback may be stored in learning content manager 130, and used to tag content. This allows users to force content adaptation and alter the learning path of other students by increasing or decreasing the likelihood that the content will be used in a particular situation or for a student with a particular type of PDNA.

For example, two different video presentations may be used to teach the same skill Although the first video presentation may have a higher success rate than the second video presentation, the second video presentation is preferred by students. Taking student preferences into consideration, learning experience engine may recommend the second video presentation when the disparity between the preferences associated between the two presentations reaches a certain threshold. That is to say, when the less effective video presentation is much more preferred by the students than the first video presentation, then the second video presentation will become the default presentation recommended to students.

Assessments

In one embodiment, assessments, such as assessments 340 are included in each learning object. A student uses assessments to demonstrate the skill associated with the learning object. More than one assessment may be included in a learning object. Learners may be required to successfully complete all, or a subset, of the assessments in order to receive an advancement recommendation from learning experience engine 110. The number and type of assessments required may depend on historical data describing past experiences with the learning object or other related learning objects. For example, if a student is known to have difficulty with learning objects that include mathematical skills, a student may be required to successfully complete relatively more assessments for a particular learning object associated with a math skill.

Remediation

Remediation data, such as remediation data 330, may also be included in a learning object. In an embodiment, remediation data includes detailed information describing which learning objects are preferred remediators (objects that assist in skill building) for the current learning object, or even which learning objects the current learning object is a preferred remediator for. For example, a student may experience little or no success in completing the assessments associated with learning object 212. Learning object 212 may include remediation information listing learning objects 205 and 209 as good remediators. Remediation metrics may be used to help learning experience 110 engine determine which remediator to recommend. If learning object 205 has a higher remediation metric than learning object 209, then learning object 205 may be selected, and the student will be provided content and assessments associated with learning object 205. When the student is ready, he will advance to learning object 208, and then make another attempt at learning object 212.

Remediation information and remediation metrics may be different for different types of users, or users having particular types of PDNA. For example, learning object 205 may have a higher remediation metric than learning object 209 for group A, but learning object 205 may have a lower remediation metric than learning object 209 for group B. In addition, remediation information is not limited to learning object relationships. Remedial relationships may be formed at the assessment level, even if assessments are not within the same learning object or present skills hierarchy.

Skills Hierarchy Data

Skills hierarchy data such as skills hierarchy data 360 describes a learning object's skills hierarchy associations. Each learning object may be included in multiple skills hierarchies. For example, learning object 207 is included in skills hierarchy 200A and skills hierarchy 200B. Each of skills hierarchy 200A and skills hierarchy 200B represent a skill set. For example, skills hierarchy 200A and skills hierarchy 200B may each represent a course, such as English Composition or Linear Algebra. Overlap in skills hierarchy data illustrates the multidimensional nature of the larger skills hierarchy used in learning management platform 100.

Bloom Level Data

Bloom level data such as bloom level data 370 may be included in a learning object. Bloom level data identifies bloom taxonomy information for one or more courses in which the learning object is required. The six bloom levels describe whether a user has knowledge and can remember a concept, understands and can describe and explain a concept, can apply the concept, can analyze based on or according to the concept, can evaluate based on or according to the concept, or can create based on or according to the concept. A particular learning object may be associated with one bloom level for a particular skills hierarchy, but may be associated with a different bloom level for another skills hierarchy. For example, learning object 211 may be at the "evaluate" bloom level for skills hierarchy 200A, but may be at the "apply" bloom level for skills hierarchy 200B.

Learning Object Metadata

Metadata such as metadata 350 may include data about the learning object. For example, version information, change tracking information, or other information about the learning object may be stored in metadata 350. Metadata 350 may also include data that should be communicated to learning space platform 120 when learning space platform 120 instantiates the learning object and associated content and tools. For example, a description or mini-syllabus describing the learning object and associated skill may be sent by learning experience engine 110 when the learning object is selected by learning space platform 120. Additional metadata may be stored in learning object 300. Notes, future implementation specifics, and developmental skills hierarchy identifiers are all examples of data that may be stored in metadata 350. The amount of metadata that may be stored about an object is bound only to the system constraints or administrator discretion. Thus, metadata 350 may be considered a catch-all for other data that is to be associated with a learning object. In addition, learning objects are extendable, and may have other data categories associated with them that are not described herein.

Object-Specific Personalized Data

Detailed personalized information may be stored on a per-person, per-object basis. For example, a particular student may have reached a certain level of understanding with respect to a particular skill that is associated with a particular object. The information stored may be mapped to Bloom taxonomy levels, and may include additional student metadata that describes the particular experience that the student has had with the object. For example, metadata may describe how fast the student learned the skill, whether the student enjoyed the content used to learn the skill, and trouble-areas for the student. This information may be gathered through frequent assessments, learning activities, learning games, homework assignments, and participation in group activities, in addition to other information-generating events associated with the student's interaction with learning management system 100.

Traversing the Skills Hierarchy

The phrase "traversing the skills hierarchy" refers to a student's progression through the learning objects in the skills hierarchy. A skills hierarchy for a particular course syllabus, such as skills hierarchy 200B, may include multiple learning objects, such as learning objects 207-213 and 215-217. The skills hierarchy may be for a statistics course, and require all of the skills included in the associated learning objects to be acquired by the student in order to mark the course as "completed" for the student. Skills hierarchy 200B is not necessarily representative of a desired or anticipated size of a skills hierarchy for a particular course. For example, a skills hierarchy for a statistics course may include hundreds of learning objects, each directed to a granular skill or concept.

A student begins traversing the skills hierarchy by receiving a learning recommendation from learning experience engine 110. If the student has not interacted with learning management platform 100 before, then the student will need to provide information to help build a PDNA. For example, the student may need to take one or more pre-assessments to determine the skill level that the student has with respect to his program. Generally, the more pre-assessments the student takes, the more accurate the initial recommendation will be. Other useful information such as transcript information from higher education institutions may also help to build a PDNA for the user.

Learning experience engine 110 takes into account information stored in the student's PDNA such as pre-assessment information, information stored in knowledge base 160, and information learned from data analysis engine to determine which skills hierarchy the student should traverse, and which learning object on that skills hierarchy the student should begin with. For example, knowledge base 160 may include information about the student that indicates the student has completed the course associated with skills hierarchy 200A, and has therefore completed learning objects 207, 208, and 211. The learning recommendation may therefore not consider these learning objects as required because they have been completed in a previous course. Learning experience engine 110 may therefore recommend that the student begin at learning object 209 on skills hierarchy 200B.

Learning object 212 may represent the ability to calculate a confidence interval, which is used to indicate the reliability of statistical estimates. Because confidence intervals are typically expressed as a percentage, the ability to calculate percentages may be considered a prerequisite skill, identified by learning object 208. Skills hierarchy 200B indicates that learning object 209 also represents a prerequisite skill for learning object 212. Given this information, and the knowledge that the student has completed the course represented by skills hierarchy 200A, it may be determined that learning object 209 is the only prerequisite required in order for the student to attempt learning object 212, even though learning object 208 was completed as part of a separate course.

In an embodiment, when a student attempts to complete a learning object, but experiences little or no success completing assessments associated with that learning object, the student will traverse the skills hierarchy toward a remedial learning object. For example, if a student completes the assessments at learning object 212 with a small metric of success, such as answering only 20% of questions correctly or completing tasks incorrectly, learning experience engine 110 may recommend that the student move to learning object 203. Alternatively, if a student completes the most difficult or complicated assessments associated with a learning object with complete accuracy, it is possible that the system is unaware of skills possessed by the student. Learning experience engine 110 may therefore recommend that the student begin at a much higher level, even skipping levels in the skills hierarchy. For example, a student that successfully completes the most difficult assessments associated with learning object 211 with perfect accuracy may receive a recommendation to attempt assessments associated with learning object 217 in order to complete the course. Based on the assessment information, learning experience engine 110 may indicate that the student has finished the course, or may recommend additional content that is appropriate for the student.

It is not necessary that the types of tools or content used for remediation be similar to the tools and content used for the skill that required remedial training. Furthermore, it is not the case that the course that includes the skill requiring remedial training be in a similar category to the learning object required for remediation. For example, a group of business students in an MBA business development course may be working on a learning object using a collaborative tool that includes a shared whiteboard, a chat session, and a voice over Internet protocol connection. During the collaborative session, however, the students may be required to calculate the net present value (NPV) of a company, which is the total present value of a time series of cash flows. Cash flows must be discounted to a present value, and then summed together. If a particular student has difficulty making the calculation, the present learning object for that student may be interrupted by learning space platform 120 and retrieve a recommendation from learning experience engine 110. Learning experience engine 110 may recommend that the student use a particular behaviorism-based tool associated with another learning object in order to acquire the necessary skill to calculate NPV. Once the student successfully completes the mathematics assessment, he will then be returned to the collaborative session with the other MBA students. This example illustrates the platform's unifying data concepts and date driven behavior—switching between appropriate learning models (e.g. a student may have been in a social constructivist learning space working on a case study on finance when the need for remediation of a concept surfaced. The next experience chosen by the platform might be an implementation of a cognitive tutor designed for math instruction.

In the previous example, learning experience engine 110 effectively created a mini-course for the student to ensure he has the skills required to be successful on his current track. This is possible partly because the learning management platform 100 keeps track of data about the students across different courses, and uses this information to help the student traverse the tree. For example, the MBA student may have already taken algebra, so a short remedial path to remind the student may have been the only information that the student needed in order to move on. However, if the student's algebra course was over two years ago, and he has taken no math since then, learning experience engine 110 may recommend a more detailed review of algebraic concepts, even taking into consideration future courses that the student is expected to take and the math skills required for those expected courses.

While the student is traversing the tree, content, tools, and learning object metadata are changed to reflect the success of the path taken by the student. For example, a student may perform poorly on one or more assessments associated with learning object 216. Remediation data associated with learning object 216 indicates that learning object 209 or a particular assessment or content item associated with learning object 209 is a good remediator for learning object 216, or even a particular assessment associated with learning object 216. If the student is directed to learning object 209 for remediation, and then attempts the assessment at learning object 216 again with success, then a remediation metric describing the association between learning object 216 and learning object 209 is changed to reflect the success. In this way, the skills hierarchy itself is dynamic and always changing based on input from the students.

The distinct paths that a student may take reside in a multidimensional learning space associated with a skills hierarchy. The path that a student may take through a multidimensional learning space should provide the most efficient and best outcome for a student. A skills hierarchy includes many learning objects, and learning objects include or are associated with a skill and variety of content and assessments. Although two students may be said to have acquired the same skills, completing the same course, each student may have taken a different learning path.

For example, student A may be a visual learner, and be cognitively similar to a set of students. These students are places into a particular group, or "tribe," based on their cognitive similarities. In this example the tribe is referred to as tribe A. Student B, who is part of a different tribe, may learn well by reading text, and gain very little benefit from visual learning techniques. Based on this information, learning experience engine 110 will provide different recommendations to each student for some learning objects. For example, student A may acquire the skill associated with learning object 206 by watching a video and completing three assessments that are based on an interactive game tool. Student B, on the other hand, may acquire the same skill by reading a chapter in an e-book, and completing a single assessment requiring a writing assignment.

While traversing the skills hierarchy, students may provide feedback by "tagging" content that they are interacting with. For example, a student may particularly enjoy an interactive learning game. The student may select a user interface element such as a button labeled with the word "fun" to indicate the preference. This information may be used in later learning recommendations for the student and other students that are cognitively similar to the student.

The skills hierarchy may also evolve over time. By analyzing data associated with a particular learning object, such as data the shows how well students in different categories perform with respect to the learning object, learning experience engine 110 may determine that the object itself is defective or produces a sub-optimal result. For example, if a group of students that tend to perform well do not perform well on assessments associated with a particular object, then it is possible that the content used to teach the skill is mismatched with the assessments associated with the particular learning object. Learning experience may generate reports that highlight these deficiencies so that course developers and content developers may change the learning object, or introduce an alternate, competitive learning object. Competitive learning objects will be described in greater detail hereinafter.

Targeted Interaction

Students, faculty, and other users of the system may interact with one another using collaborative tools and social networking features associated with the learning management platform 100. In an embodiment, any student working on any assignment from any location at any time will be able to click a single button to inquire who else among the faculty or students is working at the same time, in the same or similar content area, and then begin to engage in questions or discussion. For example, a student that is working on a particular learning object may wish to collaborate with other students, faculty, tutors, or other users of the system working on the same learning object.

In an embodiment, the student may press a button or otherwise interact with a user interface element associated with collaboration logic built into learning experience engine 110, thereby generating a collaboration request to the learning management system. In response to receiving the request, the learning management system determines which other users of the system are available for collaboration with respect to the particular learning object. The learning management system then returns a list of available collaborators to the student. Although this embodiment is directed to collaboration based on learning objects, this concept may be used with any other commonality between collaborating users. For example, users may collaborate with other users of the system that have some association with a particular skill hierarchy.

In an embodiment, users of the system may define preferences associated with collaborative learning. For example, students may wish to work collaboratively with other students, or may wish to only work with faculty or tutors. Additionally, students may wish to collaborate only with other students that have similar cognitive DNA. These preferences and other preferences based on any other similarities or differences between users may be stored as part of a student's cognitive DNA, and may be used to determine the makeup of a collaborative group.

Collaborative groups may also be limited to optimal group sizes. In an embodiment, the group sizes of the groups to which users are assigned may be based on cognitive DNA similarities between the users. For example, a particular type of student may perform better in a smaller group, while another type may perform well with larger groups. Group size may also be based on the type of collaborative tool being used. For example, a shared whiteboard system may become less effective as more people attempt to draw on it. However, a chat room associated with a video tutorial may allow for a larger number of users, which may be further based on the activity level of the chat room.

Students may collaborate with other users of the system that are using the same learning tools as themselves, or may collaborate with students that are using a different learning tool than they are. For example, a collaboration may involve one student writing on a white board, and another student typing in a chat room. The input to the white board may be dynamically translated to text that appears in the chat room, while the text in the chat room appears on the white board.

In an embodiment, a user of the system, such as a faculty member or first student may provide a learning tool recommendation to a second student based on the information shared in the collaboration session.

Competitive Learning Objects

Each node in a skills hierarchy has been described herein as having a single learning object. However, nodes in a skills hierarchy need not be limited to having only one associated learning object. Competitive learning objects that are directed to a similar or identical skill may reside at the same node in a skills hierarchy. Each learning object may include different content and assessments than the other learning objects that occupy the node.

Metadata associated with each learning object of a node may indicate the success or failure of that learning object across categories. For example, one learning object may be more successful for nursing students while another learning object may be more successful for engineering students. Although different categories of students are discussed, other factors may be used to measure the success of a learning object. For example, a first learning object may be a better remediator than a second learning object for a particular node in a skills hierarchy that is associated with a different course.

Competing learning objects are also useful when introducing new content and skills into the learning management platform 100. Adding a learning object as a competitive learning object rather than replacing the existing learning object allows for a trial period to determine whether the new learning object provides an improvement over the old. Integration of new objects and content may therefore be seamless. It may also turn out that the best action is to leave all of the competing learning objects in place because they each provide a different benefit that the other learning objects sharing the node space cannot.

Learning System Modules

In the illustrated embodiment, the learning management platform 100 includes an Application Programming Interface (API) 115 that is configured to interact with learning system modules. API 115 may be implemented over a network connection or any other communication method. Learning system modules may include third-party artificial intelligence systems or other decision making recommendation, and learning systems. These learning system modules may have access to other elements of the learning management platform 100, such as personal cognitive DNA manager 170, or may perform independent of these other elements. In an embodiment, skills hierarchy manager 180 operates as a learning system module, and interfaces with API 115. Learning modules are not limited by learning management platform 100, and may include additional supporting systems, hardware, networking equipment, cloud-computing systems, and external data sources. Learning modules may include any software, hardware, or network resources necessary to perform optimally.

Although a skills hierarchy-based system has been presented, such a system, which may include skills hierarchy manager 180, is not required for learning space platform 100 to function. Learning system modules such as learning system modules 190A, 190B, and 190C, may be configured to operate based on any model or criteria. Rule-based models, for example, may include a decision-making structure that is much different than a directed graph approach, taxonomy, or the skills hierarchy described herein. For example, a learning system module configured to operate using a rule-based model may receive, as input from learning experience engine 110, a text-based answer from a student. Based on rules within the model used by the learning system module, the module may reject the answer, and may provide associated information to learning experience engine 110. The rule may be based on linguistics or any other criteria. For example, the learning system module may detect that the text-based answer was misspelled, or that a word did not have the required number of syllables, or that the sentence or paragraph structure was incorrect. A learning system module may even include rules to determine that an essay is missing a thesis sentence.

Learning system modules need not be tied to one particular model. For example, a rule-based model may be combined with another model, such as a directed graph-based model in order to achieve the advantages of both models. In addition, no formal model is required in order to interface with learning experience engine 110. For example, a subject-specific cognitive tutor may be developed with no regard to learning theory whatsoever, and use a completely new structure and means for decision making, and that cognitive tutor may function as a learning system module that may be "plugged-in" to learning experience engine 110 by using an interface compatible with API 115.

Competing learning system modules may be used, allowing learning experience engine 110 to receive input from multiple modules, and then provide the best overall learning experience for the student. For example, an artificial intelligence based module, a taxonomy module, and a rule-based module that are all designed to teach a student to play the game of chess may be concurrently communicatively connected to API 115. Each module may store metadata associated with learning content stored in learning content manager 130, learning tools stored or indexed in learning tools manager 140 or any other data required to provide a response to learning experience engine 110. Learning experience engine 110 may request information, data, or recommendations from each module that it then uses to provide a learning recommendation to the student. Learning experience engine 110 may determine that the experience provided to the student is superior when a particular module is used during a particular portion of the learning experience. This decision may be based on any criteria. For example, the experience may be deemed superior based on the speed at which the student progresses, based on more superficial information, such as the delay incurred by using a less efficient module.

Since learning experience engine 110 is capable of concurrently receiving input from more than one module, new modules may be added to the learning management platform 100 and gradually integrated into the system. Each module may increase in importance and influence based on the merit as determined over time by learning experience engine 110. Alternatively, a new module may be configured by an administrator of the learning management platform 100 to be the primary module used for a particular subject, skill, or task. For example, an independently tested and proven module may be integrated into learning management platform 100 and immediately promoted as the module with the most merit, overriding any determination made by learning experience engine 110. Learning experience engine 110 may then be configured to perform additional merit determinations for the new module, as well as existing modules.

Alternative Embodiments

In an embodiment, learning experience engine 110 may provide more than one recommendation for the student, along with data about each recommendation such as data associated with content or learning objects. The student then may be able to choose a learning experience based on preference. Learning experience engine 110 may gather preference information for further processing by data analysis engine 150, and use the analysis to assist learning experience engine 110 in determining future recommendations for that user or cognitively similar users.

In another embodiment, multiple recommendations are provided, but learning space platform 120 may make the final decision regarding which content, assessment, or learning objects are presented to the user. This method allows local logic to offload processing of the final learning recommendation based on transitory environmental factors that are overriding, such as location, mobile network signal strength, or lighting detected by the device.

In another embodiment, learning experience engine 110 may provide a group of learning objects and associated content, assessments, and tools, along with logic to allow learning space platform to determine, based on assessment performance, which of the group of learning objects should be presented next. This method allows for extended offline learning. In this embodiment, learning space platform 120 may still detect connectivity and request an additional group of learning objects based on assessment performance, advancing the state of the locally stored data in order to keep a cache of offline learning information, content, and tools available at all times.

In another embodiment, a control system is included in learning management platform 100. The control system may be configured to select the next steps of the learning space navigation automatically or enable the navigation to include explicit steps set up by a faculty member, or a hybrid operation where a faculty member may decide to selectively override some of the steps of the skills hierarchy traversal.

In an embodiment, learning management platform 100 includes a personalized assessment system that is capable of taking different goal sets from students, faculty, institutions, and employers, and selecting the right set of assessments to ensure that the student has mastered the right skills in-line with the goals.

Example Method for Providing Learning Recommendations Based on Profile Similarity In an embodiment, profiles are maintained for students by personal cognitive DNA manager 170 and knowledge base 160. These profiles may include PDNA, and describe one or more education-related attributes associated with students. A profile snapshot (PS1T1) that represents the state of the profile of a first user at a particular point in time (T1) is also maintained. A current profile (PS1T2) that represents a state of the profile of the first user at a second point in time (T2) is also maintained for the first user. Another current profile (PS2T2) that represents a state of the profile of a second user at a second point in time (T2) is also maintained.

In response to a request, for content, from the second user, learning management platform 100 determines, based at least in part on an attribute of the profile snapshot PS1T1 of the first user that is not an attribute of the current profile PS1T2 of the first user, that a similarity exists between the current profile of the second user and the profile snapshot of the first user. Based on the similarity between the out of date profile (PS1T1) of the first user and the current profile PS2T2 of the second user, a content item is selected for delivery to the second user.

For example, a first user may currently learn most effectively by using video-related learning tools, but that at time T1 the first user may have learned most effectively by reading text. If the second user, who currently learns most effectively by reading text, needs a learning tool, the current profile P2T2 of the second user can be matched to a snapshot of the first user's profile P1T1 (that was taken at time T1) to determine a learning recommendation for the second user. For example, if at time T1 the first user learned a concept well by reading text X, then the learning recommendation may be for the second user to read text X (even though that would not be the learning recommendation that would now be given to the first user).

Example Method for Recommending Content Based on Student Context

In an embodiment, learning objects are maintained by skills hierarchy manager 180. Profiles are maintained for students by personal cognitive DNA manager 170 and knowledge base 160. Each profile describes one or more transient attributes that change simultaneously with environmental or emotional circumstances associated with the corresponding user. For example, a student may feel tired or sad, and indicate this through a user interface provided by learning space platform 120. This information may be reported to learning experience engine 110, which may store the information in knowledge base 160. As another example, learning space platform 120 may be executing on a mobile device with GPS (Global Positioning System) capabilities, and may report location information to learning experience engine 110, which may store the information in knowledge base 160.

A profile may have one or more persistent attributes that describe characteristics of the student that are pertinent to educational activities, such as learning style. For example, a particular student may not learn effectively when exclusively using audio content. Although two students may have the same value for a particular transient attribute, they may have different values for a particular persistent attribute. For example, both students may be on a train (a transient attribute), but one student is unable to learn effectively using the type of content available for use while in transit (a persistent attribute) while the other student is able to learn effectively using the type of content available for use while in transit. Under these circumstances, learning experience engine 110 may decide to recommend one learning object to the student who is better able to learn on the train. The other student may receive a recommendation to wait until off the train to continue learning activities.

Example Method for Facilitating Targeted Interaction Between Students

In an embodiment, profiles are maintained for students by personal cognitive DNA manager 170 and knowledge base 160. A student sends a request for interaction with other users. For example, a particular student may want to discuss a particular educational concept with other students. Learning experience engine 110 detects a group of students that are interacting with the same learning object or similar learning objects to the learning object that the particular student is interacting with. Learning experience engine 110 then compares the profiles of the particular user with the group of students that are interacting with similar learning objects, and determines which of those students are similar to the particular student. At least one other student is selected to interact with the particular student based on this comparison. For example, a second student may be invited to a virtual whiteboard session or live chat session with the particular student.

Example Method for Competitive Learning Objects in a Skills Hierarchy

In an embodiment, a hierarchy of learning objects is maintained by skills hierarchy manager 180. Each learning object in the hierarchy is associated with a corresponding skill and content items that help students to master the skill A particular node is occupied by two learning objects that are competing with one another to be the preferred learning object at that node. Both learning objects are associated with the same skill. However, the learning objects may be associated with different content or logic that defines different content preferences that cause different content to be delivered to different students, even though the circumstances of each student may be the same.

For example, two learning objects residing at the same node in a skills hierarchy may be designed to teach the skills required to perform integration by parts, concept in calculus. The first learning object may employ interactive learning games to teach the concept, while the second learning object may use a series of videos to teach the concept. The first learning object may be recommended to a first student, while the second learning object may be recommended to a second student, even though the first and second student are cognitively similar with respect to personal attributes associated with mathematics.

Example Method for Dynamically Altering Learning Object Remediation Preferences

In an embodiment, a hierarchy of learning objects is maintained by skills hierarchy manager 180. Each learning object in the hierarchy is associated with a corresponding skill and one or more corresponding assessment items. The assessment items measure the level of success that users attain with respect to the corresponding learning object. In response to determining that a first user has attained a first level of success with respect to a first learning object, a second learning object that is associated with a second skill is selected by learning experience engine 110 for recommendation to the first user.

In response to determining that a second user has attained the first level of success with respect to the first learning object, and based at least in part on determining that the first user has attained a second level of success with respect to the second learning object, learning experience engine 110 selects a third learning object to recommend to the second user, wherein the third learning object is associated with a third skill.

For example, a first student may have performed poorly on an assessment for a learning object designed to teach the user skills related to graphing polynomial functions. To help the first student bolster his skills, learning experience engine may recommend a second learning object to the first student. The skill associated with the second learning object may be related to graphing functions generally. However, the first student may also perform poorly on an assessment for the second learning object. This may be an indication that the second learning object is not a good remediator for the first learning object, given the level of performance demonstrated by the first student. Therefore, when a second student achieves the same level of performance on the assessment for the first learning object, the second student receives a recommendation for a third learning object, such as one that focuses on more general graphing skills.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
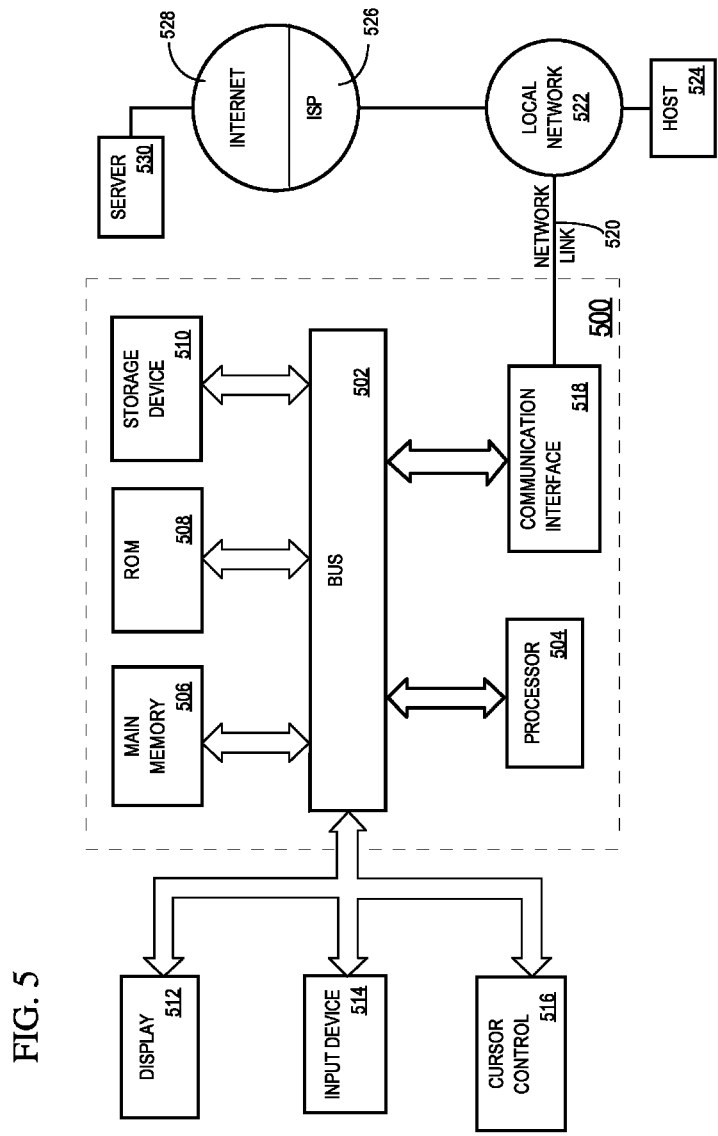
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
maintaining for a plurality of users of an online system, profiles, wherein the profile maintained for each of the plurality of users describes one or more attributes associated with the corresponding user of the plurality of users;
wherein a first profile that is associated with a first user of the plurality of users includes first attribute values, and a second profile that is associated with a second user of the plurality of users includes second attribute values;
automatically inferring one or more of the first attribute values based, at least in part, on data collected by the online system for the first user;
automatically inferring one or more of the second attribute values based, at least in part, on data collected by the online system for the second user;
in response to a request, from the first user, to interact with one or more other users of the plurality of users:
detecting which particular subject matter the first user is currently working on;
identifying a particular set of other users that are currently working on the particular subject matter or subject matter related to the particular subject matter;
wherein identifying the particular set of other users that are currently working on the particular subject matter or subject matter related to the particular subject matter includes detecting that the second user is currently working on second subject matter that is associated with a course of study that the particular subject matter is associated with;
wherein the particular set of other users includes the second user;
based on a comparison between the first profile that is associated with the first user and the second profile that is associated with the second user, determining that the first attribute values of the first profile are similar to the second attribute values of the second profile;
selecting the second user from among the particular set of other users based, at least in part, on the determination that the first attribute values of the first profile are similar to the second attribute values of the second profile;
facilitating interaction between the first user and the second user;
wherein the method is performed by one or more computing devices.

2. The method of claim 1, wherein facilitating interaction includes notifying at least one of the first user and the second user about the other of the first user and the second user.

3. The method of claim 1, wherein facilitating interaction includes providing to at least one of the first user and the second user a mechanism by which the at least one user may interact with the other of the first user and the second user.

4. The method of claim 1, wherein identifying the particular set of other users that are currently working on the particular subject matter or subject matter related to the particular subject matter includes detecting that a third user of the particular set of other users is currently working on the particular subject matter in association with a particular course of study with which the first user is not associated.

5. The method of claim 1, further comprising:
based on a comparison between the first profile that is associated with the first user and a third profile that is associated with a third user of the particular set of other users, determining that attribute values of the first profile are similar to attribute values of the third profile;
selecting the third user to interact with the first user based at least in part on the determination that attribute values of the first profile are similar to attribute values of the third profile.

6. The method of claim 1, further comprising:
based on a comparison between the first profile that is associated with the first user and a third profile that is associated with a third user of the particular set of other users, determining that attribute values of the first profile are similar to attribute values of the third profile;
determining that the third user should not be selected to interact with the first user based at least in part on a determination that an optimal number of users have already been selected as members of a first interaction group that includes the first user.

7. The method of claim 6, wherein the users that have been selected as members of the first interaction group are users of the plurality of users, and the optimal number of users is determined based at least in part on one or more attributes stored in the profiles of members of the first interaction group.

8. The method of claim 1, further comprising:
receiving, from the second user, a learning recommendation directed to the first user, wherein the learning recommendation identifies one or more of: a learning tool; a subject matter other than the particular subject matter; or a learning content item.

9. A computer-readable non-transitory storage medium storing instructions which, when executed by one or more processors, cause:
maintaining for a plurality of users of an online system, profiles, wherein the profile maintained for each of the plurality of users describes one or more attributes associated with the corresponding user of the plurality of users;
wherein a first profile that is associated with a first user of the plurality of users includes first attribute values, and a second profile that is associated with a second user of the plurality of users includes second attribute values;
automatically inferring one or more of the first attribute values based, at least in part, on data collected by the online system for the first user;
automatically inferring one or more of the second attribute values based, at least in part, on data collected by the online system for the second user;
in response to a request, from the first user, to interact with one or more other users of the plurality of users:
detecting which particular subject matter the first user is currently working on;
identifying a particular set of other users that are currently working on the particular subject matter or subject matter related to the particular subject matter;
wherein identifying the particular set of other users that are currently working on the particular subject matter or subject matter related to the particular subject matter includes detecting that the second user is currently working on second subject matter that is associated with a course of study that the particular subject matter is associated with;
wherein the particular set of other users includes the second user;
based on a comparison between the first profile that is associated with the first user and the second profile that is associated with the second user, determining that the first attribute values of the first profile are similar to the second attribute values of the second profile;
selecting the second user from among the particular set of other users based, at least in part, on the determination that the first attribute values of the first profile are similar to the second attribute values of the second profile;
facilitating interaction between the first user and the second user.

10. The computer-readable non-transitory storage medium of claim 9, wherein facilitating interaction includes notifying at least one of the first user and the second user about the other of the first user and the second user.

11. The computer-readable non-transitory storage medium of claim 9, wherein facilitating interaction includes providing to at least one of the first user and the second user a mechanism by which the at least one user may interact with the other of the first user and the second user.

12. The computer-readable non-transitory storage medium of claim 9, wherein identifying the particular set of other users that are currently working on the particular subject matter or subject matter related to the particular subject matter includes detecting that a third user of the particular set of other users is currently working on the particular subject matter in association with a particular course of study with which the first user is not associated.

13. The computer-readable non-transitory storage medium of claim 9, wherein the instructions further include instructions for:
based on a comparison between the first profile that is associated with the first user and a third profile that is associated with a third user of the particular set of other users, determining that attribute values of the first profile are similar to attribute values of the third profile;
selecting the third user to interact with the first user based at least in part on the determination that attribute values of the first profile are similar to attribute values of the third profile.

14. The computer-readable non-transitory storage medium of claim 9, wherein the instructions further include instructions for:
based on a comparison between the first profile that is associated with the first user and a third profile that is associated with a third user of the particular set of other users, determining that attribute values of the first profile are similar to attribute values of the third profile;
determining that the third user should not be selected to interact with the first user based at least in part on a determination that an optimal number of users have already been selected as members of a first interaction group that includes the first user.

15. The computer-readable non-transitory storage medium of claim 14, wherein the users that have been selected as members of the first interaction group are users of the plurality of users, and the optimal number of users is determined based at least in part on one or more attributes stored in the profiles of members of the first interaction group.

16. The computer-readable non-transitory storage medium of claim 9, wherein the instructions further include instructions for:
receiving, from the second user, a learning recommendation directed to the first user, wherein the learning recommendation identifies one or more of: a learning tool; a subject matter other than the particular subject matter; or a learning content item.

17. An apparatus, comprising:
one or more processors;
a computer readable storage medium comprising instructions which, when executed by the one or more processors, cause performance steps comprising:
maintaining for a plurality of users of an online system, profiles, wherein the profile maintained for each of the plurality of users describes one or more attributes associated with the corresponding user of the plurality of users;
wherein a first profile that is associated with a first user of the plurality of users includes first attribute values, and a second profile that is associated with a second user of the plurality of users includes second attribute values;

automatically inferring one or more of the first attribute values based, at least in part, on data collected by the online system for the first user;
automatically inferring one or more of the second attribute values based, at least in part, on data collected by the online system for the second user;
in response to a request, from the first user, to interact with one or more other users of the plurality of users:
  detecting which particular subject matter the first user is currently working on;
  identifying a particular set of other users that are currently working on the particular subject matter or subject matter related to the particular subject matter;
  wherein identifying the particular set of other users that are currently working on the particular subject matter or subject matter related to the particular subject matter includes detecting that the second user is currently working on second subject matter that is associated with a course of study that the particular subject matter is associated with;
  wherein the particular set of other users includes the second user;
  based on a comparison between the first profile that is associated with the first user and the second profile that is associated with the second user, determining that the first attribute values of the first profile are similar to the second attribute values of the second profile;
  selecting the second user from among the particular set of other users based, at least in part, on the determination that the first attribute values of the first profile are similar to the second attribute values of the second profile;
  facilitating interaction between the first user and the second user.

18. The method of claim 1, wherein the step of automatically inferring one or more of the first attribute values comprises automatically inferring one of:
  how the first user learns,
  what level the first user has achieved in a particular course,
  whether the first user understands a particular concept or possesses a particular skill,
  a pace at which the first user learns, or
  a time of day at which the first user is most likely to correctly answer a question.

19. The method of claim 1, wherein the request from the first user does not specify any particular user with whom the first user desires to interact, further comprising:
  while a particular set of users, that includes the first user, are currently working on the particular subject matter or subject matter related to the particular subject matter:
    receiving said request from the first user;
    receiving a second request, from a third user of the plurality of users, to interact with one or more other users of the plurality of users, wherein the second request does not specify any particular user with whom the third user desires to interact; and
    in response to the second request, performing the steps of:
      detecting that the third user is currently working on at least the particular subject matter;
      based on a comparison between a third profile that is associated with the third user and a fourth profile that is associated with a fourth user that is currently working on the particular subject matter, determining that attribute values of the third profile are similar to attribute values of the fourth profile;
      in response to determining that attribute values of the third profile are similar to attribute values of the fourth profile, facilitating interaction between the third user and the fourth user;
    wherein the first user and the second user are not exposed to the interaction between the third user and the fourth user; and
    wherein the third user and the fourth user are not exposed to the interaction between the first user and the second user.

20. The computer-readable non-transitory storage medium of claim 9, wherein the step of automatically inferring one or more of the first attribute values comprises automatically inferring one of:
  how the first user learns,
  what level the first user has achieved in a particular course,
  whether the first user understands a particular concept or possesses a particular skill,
  a pace at which the first user learns, or
  a time of day the first user is most likely to correctly answer a question.

21. The computer-readable non-transitory storage medium of claim 9, wherein the request from the first user does not specify any particular user with whom the first user desires to interact, further comprising instructions for:
  while a particular set of users, that includes the first user, are currently working on the particular subject matter or subject matter related to the particular subject matter:
    receiving said request from the first user;
    receiving a second request, from a third user of the plurality of users, to interact with one or more other users of the plurality of users, wherein the second request does not specify any particular user with whom the third user desires to interact; and
    in response to the second request, performing the steps of:
      detecting that the third user is currently working on at least the particular subject matter;
      based on a comparison between a third profile that is associated with the third user and a fourth profile that is associated with a fourth user that is currently working on the particular subject matter, determining that attribute values of the third profile are similar to attribute values of the fourth profile;
      in response to determining that attribute values of the third profile are similar to attribute values of the fourth profile, facilitating interaction between the third user and the fourth user;
    wherein the first user and the second user are not exposed to the interaction between the third user and the fourth user; and
    wherein the third user and the fourth user are not exposed to the interaction between the first user and the second user.

* * * * *